United States Patent
Cheng et al.

(10) Patent No.: US 11,476,768 B2
(45) Date of Patent: Oct. 18, 2022

(54) FLYBACK CONVERTER FOR CONTROLLING ON TIME VARIATION

(71) Applicant: ALPHA AND OMEGA SEMICONDUCTOR INTERNATIONAL LP, Sunnyvale, CA (US)

(72) Inventors: Jung-Pei Cheng, Zhubei (TW); Hung-Ta Hsu, Zhudong Township (TW)

(73) Assignee: ALPHA AND OMEGA SEMICONDUCTOR INTERNATIONAL LP, Sunnyvale, CA (US)

( * ) Notice: Subject to any disclaimer, the term of this patent is extended or adjusted under 35 U.S.C. 154(b) by 136 days.

(21) Appl. No.: 17/036,263

(22) Filed: Sep. 29, 2020

(65) Prior Publication Data
US 2021/0257920 A1    Aug. 19, 2021

(30) Foreign Application Priority Data

Feb. 19, 2020  (CN) .......................... 202010103039.1
May 22, 2020  (CN) .......................... 202010443218.X

(51) Int. Cl.
H02M 3/335    (2006.01)

(52) U.S. Cl.
CPC ... *H02M 3/33569* (2013.01); *H02M 3/33507* (2013.01)

(58) Field of Classification Search
None
See application file for complete search history.

(56) References Cited

U.S. PATENT DOCUMENTS

| | | | | |
|---|---|---|---|---|
| 8,913,407 | B2* | 12/2014 | Lund | H02M 3/33523 323/284 |
| 9,525,357 | B2 | 12/2016 | Chen | |
| 9,812,945 | B2* | 11/2017 | Li | H02M 3/33507 |
| 10,177,670 | B1 | 1/2019 | Lin et al. | |
| 10,224,821 | B2 | 3/2019 | Zhang et al. | |
| 11,196,348 | B2* | 12/2021 | Chromcak | H02M 1/08 |
| 2020/0091826 | A1 | 3/2020 | Yang et al. | |

FOREIGN PATENT DOCUMENTS

CN    105471291 A    4/2016

* cited by examiner

*Primary Examiner* — Jeffrey A Gblende
(74) *Attorney, Agent, or Firm* — Chen-Chi Lin

(57) ABSTRACT

A flyback converter to control conduction time in AC/DC conversion technology. The flyback converter includes a primary side and a secondary side. The primary side includes a main switch connecting a primary coil to the input of the flyback converter in series. The secondary side includes a secondary coil coupling with the output terminal of the flyback converter. When a switching frequency of the main switch is at a preset first on time in the range between the off frequency and the second switching frequency, the on-time of the main switch continuously changes corresponding to output load changes. When the switching frequency of the main switch is higher than the first switching frequency, the on time of the main switch is constant. The on time is controlled to change linearly, so as to avoid excessive changes in the output voltage ripples, thereby improving circuit efficiency.

14 Claims, 14 Drawing Sheets

FLYBACK CONVERTER FOR CONTROLLING ON TIME VARIATION

CROSS-REFERENCE TO RELATED APPLICATIONS

This application claims the priority benefit of Chinese patent application number 202010103039.1 filed on Feb. 19, 2020 and Chinese patent application number 202010443218.X filed May 22, 2020. The entire Disclosures made in the Chinese patent application number 202010103039.1 and the Chinese patent application number 202010443218.X are hereby incorporated by reference.

FIELD OF THE INVENTION

This invention relates generally an AC/DC conversion circuit. More particularly, the present invention relates to a flyback converter for controlling the on time ($T_{ON}$).

BACKGROUND OF THE INVENTION

Flyback converter is a switching power supply. The flyback converter can provide isolation between input stage and output stage. Therefore, the flyback converter is widely used in AC/DC current switching scenarios. The working process of the flyback converter is mainly divided into two stages: switch on and switch off.

The primary coil on the primary side of the transformer of the flyback converter is directly connected to the input voltage during the switch on stage, increasing the current in the primary coil and the magnetic field in the transformer's magnetic core, and storing energy in the magnetic core. At this time, the voltage generated in the secondary coil on the secondary side of the transformer is reverse, so the diode is in reverse bias state and cannot be turned on. Then, the voltage and current to the load is supplied by the capacitor on the secondary coil side.

During the switch off stage, the current in the primary coil is 0, and the magnetic field in the magnetic core begins to decrease. At this time, a positive voltage is induced on the secondary coil, the diode at the secondary coil side is in a positive bias state and is turned on, and the switch-on current flows into the capacitor and load at the secondary coil side, that is, the energy stored in the magnetic core is transferred to the capacitor and load.

The above two stages are performed alternately, thus forming the whole working process of the flyback converter.

The flyback converter applied in the AC/DC scenarios often has a circuit configuration as described in FIG. 1. A primary controller 1 on the primary side is mainly responsible for controlling the on and off operation of the main switch. A secondary controller 2 on the secondary side is mainly responsible for computing the on time $T_{ON}$ and sending on/off instructions. The signals between the primary controller 1 and the secondary controller 2 are transmitted through an isolator 3. In the circuit shown in FIG. 1, the secondary controller 2 transmits the command signal of switch on to the primary controller 1 through one circuit and the command signal of switch off to the primary controller 1 through another circuit. In examples of the present disclosure, FIG. 1 may operate with the characteristics of FIG. 6.

In the existing flyback converter with COT (constant on time) control mode, the switching frequency of the main switch of the flyback converter usually depends on the output load of its secondary side. When the output load decreases, the switching frequency will decrease correspondingly, and vice versa. When the switching frequency is reduced to audible frequency range (20 Hz~20 kHz), audible audio noise will be produced, which will interfere with the normal use of the product.

In order to tackle the aforementioned audio noise phenomenon caused by low switching frequency during low load operation, as shown in FIGS. 2-3, in the prior art, when the load is reduced, and when the switching frequency is reduced to the upper limit of the audible frequency range ($f_{S\_TON\_EN}$, the frequency enable the reduction of the on time), the on time is adjusted and shortened as far as possible. It is to reduce the magnetic flux density of the transformer, and increase the switching frequency to avoid audio noise. Moreover, when being loaded from zero load and starting from small on time, the on time is adjusted when the switching frequency increases to be close to the release frequency ($f_{S\_TON\_DIS}$, the frequency disable reduction of the on time). It is to prolong the on time as far as possible and improve the efficiency while keeping the switching frequency higher than the upper limit of the audible frequency range. Specifically, when the output load is unload, the on time is set to the shortest third-order $T_{ON}$ reduction level ($T_{ONR\_3}$).

As shown in FIG. 3, as the output load gradually increases and before the on time changes to the relatively longer second-order $T_{ON}$ reduction level ($T_{ONR\_2}$), the switching frequency is close to the release frequency ($f_{S\_TON\_DIS}$). With the continual increase of the output load, the on time is converted to an even longer first-order $T_{ON}$ reduction level ($T_{ONR\_1}$), and finally converted to the longest on time $T_{ON}$ under normal output load. Accordingly, as shown in FIG. 2, the process of the output load changing from heavy load to unload also goes through several reverse on time conversions, so as to reduce the on time and increase the switching frequency. In a typical design case, the $T_{ON}$ reduction level is 80%, 64% and 50% of the original constant on time, respectively.

In the process of continuous change of low output load, the change of on time is not continuously variable, but change in steps. In the prior art, before the switching frequency is reduced to the upper limit of the audible frequency range, the on time is usually kept unchanged (i.e. maintained at the initial level), so that substantial output voltage ripple will be generated due to excessive output power during adjustment. The output load is down regulated from heavy load, and the frequency under the same load is slightly higher than $f_{S\_TON\_EN}$. Compared with the above two changes, when the output load increases from zero load and remains at a certain $T_{ON}$ reduction level, it will lead to higher switching frequency and lower circuit efficiency (compare areas A, B and C in FIG. 2 and FIG. 3).

SUMMARY OF THE INVENTION

The present invention discloses a flyback converter. The flyback converter comprises a primary side and a secondary side. The primary side comprises a primary coil and a main switch. The secondary side comprises a secondary side coil. Preset a first switching frequency and a second switching frequency. The first switching frequency is higher than the second switching frequency. When a switching frequency of the main switch is within a range between the first switching frequency and the second switching frequency, an on time of the main switch varies continuously in response to changes of the output load. When the switching frequency of the main switch is higher than the first switching frequency, the on time of the main switch remains constant.

DETAILED DESCRIPTION OF THE INVENTION

In the following sections, the technical scheme in the examples of the invention will be described in combination with the drawings for the examples of the invention. Apparently, the examples in the following description are merely a part rather than all of the examples of the present invention. All other examples obtained by a person of ordinary skill in the art based on the examples of the present invention without creative efforts shall fall within the protection scope of the present invention.

It should be noted that the examples in the present invention and the features therein can be combined with each other without conflict.

The present invention will be further described in combination with the attached drawings and examples, but not as a limitation of the present invention.

Figure 6:
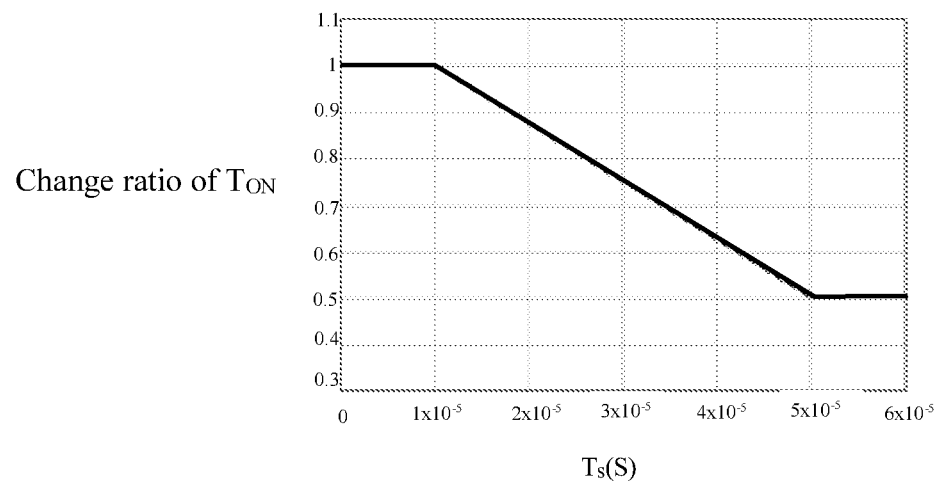
FIG. 6 is a schematic diagram of the change rate of the $T_{ON}$ adjustment by the conduction adjustment unit of the flyback converter in examples of the present disclosure.

Based on the above problems existing in the prior art, a flyback converter with variable $T_{ON}$ control is provided in this disclosure. The circuit configuration of the flyback converter may be similar or with minor variations to the one shown in FIG. 1, including a primary side and a secondary side. The primary side may include a primary coil connected to a main switch and coupled with an input of the flyback converter, and the secondary side may include a secondary coil coupled with an output load of the flyback converter. The flyback converter may further include a controller 1 arranged on the primary side and a controller 2 arranged on the secondary side. One of the two controllers may be configured as a main controller of the flyback converter that is, the flyback converter can control the conduction of the main switch according to command signals generated either by controller 1 at the primary side or by controller 2 at the secondary side. As shown in FIG. 6, in the examples of this invention, when the switching frequency of the main switch is within a preset range between a first switching frequency and a second switching frequency, the main controller controls an on time of the main switch of the flyback converter to vary continuously in response to a change of the output load. When the switching frequency of the main switch is in a range higher than the first switching frequency, the main controller controls the on time of the main switch of the flyback converter to remain constant, wherein the first switching frequency is higher than the second switching frequency. Preferably, the on time varies linearly with a switching period of the main switch, which is the reciprocal of the switching frequency of the main switch.

In the present invention, the main controller may comprise an input unit and a comparison unit, where the input terminal of the input unit receives a detection signal of the flyback converter, and the output terminal is connected to the first comparison terminal of the comparison unit, such as a positive input terminal. The second comparison terminal of the comparison unit, such as a negative input terminal, is connected to a reference voltage terminal. The comparison unit is used to output a switch-on control signal according to the voltage comparison result between the first comparison terminal and the reverse comparison terminal to control the on time of the main switch of the flyback converter.

Figure 4:
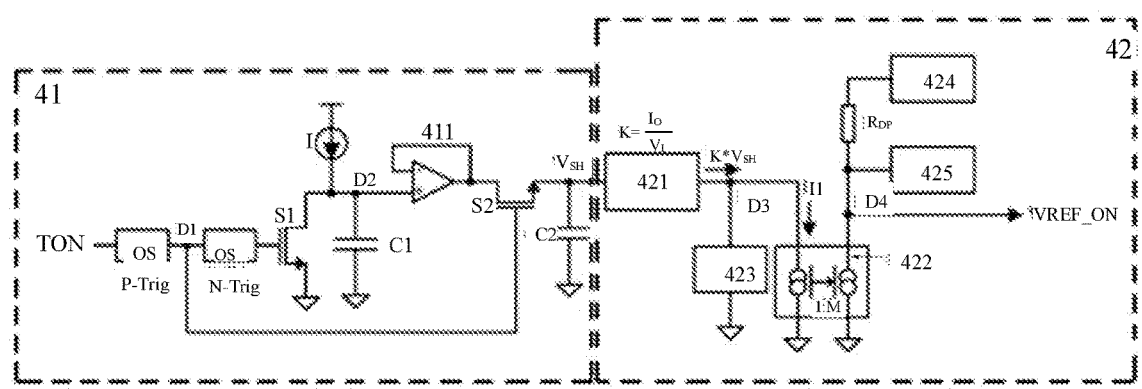
FIG. 4 is the circuit configuration diagram of the conduction adjustment unit in the flyback converter in examples of the present disclosure.

The flyback converter of this invention further includes a conduction adjustment unit, which receives the gate control signal and outputs a reference voltage to the second comparison terminal of the comparison unit to adjust the on time of the main switch. The reference voltage is negatively correlated to the switching period of the main switch. In a preferred example, the conduction adjustment unit, as shown in FIG. 4, comprises a charge-discharge module 41 and a voltage amplification module 42. An input terminal of the charge-discharge module 41 is connected to the gate of the main switch, that is, connected to receive the gate control signal $T_{ON}$. The output terminal of the charge-discharge module 41 is connected to an input terminal of the voltage amplification module 42. An output terminal of the voltage amplification module 42 is connected to a reference voltage terminal to output the reference voltage $V_{REF\_ON}$.

The charge-discharge module 41 is configured to charge and discharge according to the gate control signal $T_{ON}$ of the main switch, so that the output voltage of the charge-discharge module 41 is positively correlated to the switching period of the main switch. A divider resistor RDP is configured in the voltage amplification module 42 so that the reference voltage $V_{REF\_ON}$ output to the reference voltage terminal from the voltage amplification module 42 is negatively correlated with the output voltage of the charge-discharge module 41, and the on time of the main switch can be adjusted by adjusting the reference voltage $V_{REF\_ON}$.

Furthermore, in a preferred example of the invention, the charge-discharge module 41 comprises a rising edge trigger P-Trig having an input terminal configured as the input terminal of the charge-discharge module 41 and an output terminal connected to a first node D1. The rising edge trigger P-Trig is configured to detect a rising edge of the gate control signal $T_{ON}$ and output a first pulse signal.

The charge-discharge module 41 also comprises a falling edge trigger N-Trig having an input terminal connected to the first node D1 and an output terminal connected to a control terminal of a first switch S1. The falling edge trigger N-Trig is configured to detect a falling edge of the first pulse signal output by the rising edge trigger P-Trig and output a second pulse signal, thus the first switch S1 performs on-off control of a first charge-discharge branch between an external constant current source and a ground terminal according to the second pulse signal.

The charge-discharge module 41 also comprises a first capacitor C1 connected between a second node D2 and the ground terminal, and the second node D2 is further connected to the output terminal of the constant current source. The constant current source and the first capacitor C1 constitute a normally connected second charge-discharge branch, and the first charge discharge branch is connected in parallel with the second charge-discharge branch.

The charge-discharge module 41 also comprises a second switch S2 having a control terminal connected to the first node D1, and the second switch S2 controls on-off operations between the second node D2 and the output terminal of the charge-discharge module according to the first pulse signal.

The charge-discharge module 41 also comprises a second capacitor C2 connected between the output end of the charge-discharge module 41 and the ground terminal.

The voltage amplification module 42 comprises a converter 421 having an input terminal functioning as the input terminal of the voltage amplification module 42 and an output terminal connected to a third node D3. The converter 421 is configured to amplify an input voltage of the voltage amplification module 42 by a first preset multiple K to generate an output current.

The voltage amplification module 42 also comprises a current mirror 422 having an input connected to the third node D3 and an output connected to a fourth node D4. The current mirror 422 is configured to amplify an input current by a second predetermined multiple M to the output. One end of the divider resistor $R_{DP}$ is connected to the fourth node D4.

Figure 5:
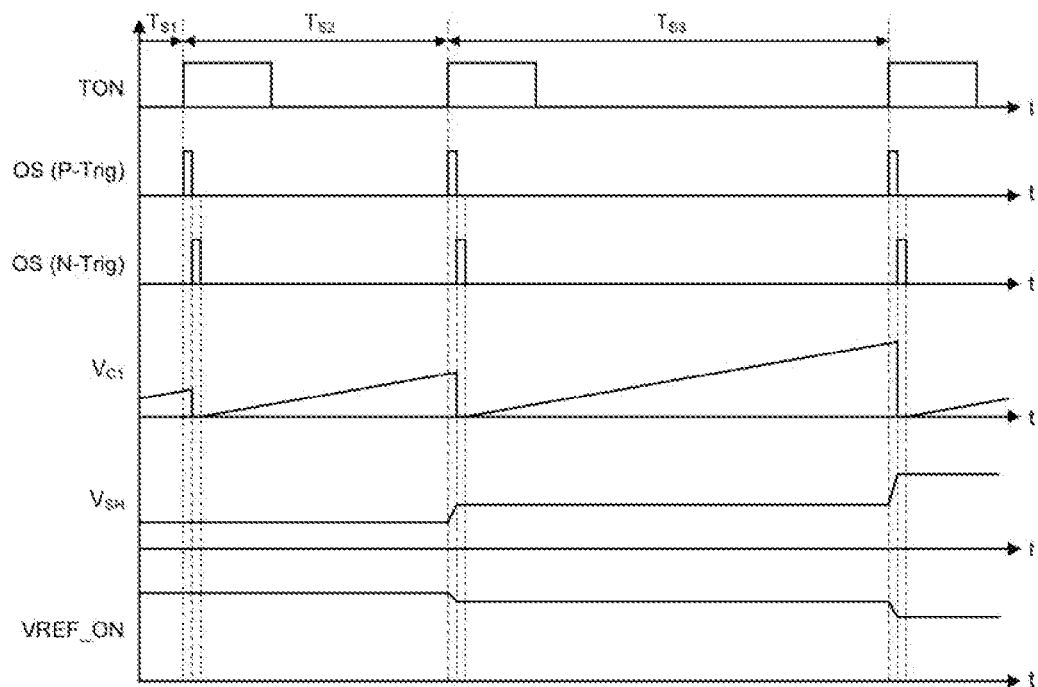
FIG. 5 is the waveform timing diagram of circuit signal of the conduction adjustment unit of the flyback converter in examples of the present disclosure.

The waveform of each circuit signal of the above-mentioned conduction adjustment unit is shown in FIG. 5. In initial state, a constant current source (1 nA-100 µA, preferably 100 nA) continuously charges the first capacitor C1 (0.1 pF-100 pF, preferably 2 pF) through the normally-on second charge-discharge branch, so that the electric charge quantity stored in the first capacitor C1 continues to rise. When the rising edge trigger P-Trig detects the rising edge of the gate control signal (that is, when the rising edge receives the control signal and is turned on), the rising edge trigger P-Trig outputs a first pulse signal, where the first pulse signal is an instantaneous trigger signal to control the instantaneous turn-on of the second switch S2, so that the first capacitor C1 begins to charge the second capacitor C2 (0.1 pF-100 pF, preferably 1 pF) through an unity gain amplifier 411, during which, based on the sample and hold principle, the voltage $V_{SH}$ flowing through the second switch S2 is equal to the voltage of the first capacitor C1.

When the falling edge trigger N-Trig detects the falling edge of the first pulse signal (i.e., the first pulse signal is low-level signal at this time), the falling edge trigger N-Trig outputs a second pulse signal (high-level signal) to turn on the first switch S1 thus the first charge-discharge branch. After the first charge-discharge branch is turned on, the voltage of the first capacitor C1 is discharged to the low level. As shown in FIG. 5, the voltage $V_{SH}$ keeps rising due to the switching period TS3>TS2>TS1 of the main switch.

The second switch S2 is connected to the converter 421, wherein the converter 421 is a V-to-I converter, which converts $V_{SH}$ into a current by a first predetermined multiple (K-times) current and then outputs the converted current. The first predetermined multiple K can be expressed as:

$$K = \frac{I_O}{V_I}$$

Where $I_O$ represents the output current of the converter 421 and $V_I$ represents the input voltage of the converter 421. The value range of the first predetermined multiple K may be 0.1 µA/V to 50 µA/V, preferably 2 µA/V.

The output current by the converter 421 flows through the current mirror 422 and is amplified by the second predetermined multiple M, and then transmitted to the output terminal of the voltage amplification module 42 as the reference voltage $V_{REF\_ON}$ input to the negative input terminal of the comparison unit. The second predetermined multiple M is set to 1 by default, values ranging between 0.01-100.

In this example, since a divider resistor $R_{DP}$ is also connected to the fourth node D4, the final output reference voltage $V_{REF\_ON}$ is negatively correlated with the voltage $V_{SH}$ flowing through the second switch S2, that is, when the voltage $V_{SH}$ rises, the output reference voltage $V_{REF\_ON}$ decreases.

Based on the circuit configuration and operation principle of the above-mentioned conduction adjustment unit, and combined with the schematic diagram of waveform timing change in FIG. 5, the final output reference voltage $V_{REF\_ON}$ is related to the switching period. In other words, if the switching period is longer, the switching frequency of the flyback converter is lower, the charging time of the first capacitor C1 is longer, the voltage $V_{SH}$ flowing through the second switch S2 during discharge is the higher, and the output reference voltage $V_{REF\_ON}$ is lower, which is ultimately fed back to the main controller to adjust the on time of the main switch.

Further, in a preferred example of the present invention, as shown in FIG. 4, the voltage amplification module further includes an offset current controller 423 connected between the third node D3 and the ground terminal to provide a preset offset current $I_{OFFSET}$, and a first clamping circuit 424 connected to a first terminal of the divider resistor $R_{DP}$ away from the fourth node D4 to clamp down the voltage at the first terminal of the divider resistor $R_{DP}$ at a first preset voltage VC1 (0.2V-5V, preferably 2V). The voltage amplification module further includes a second clamping circuit 425 connected to the second terminal of the voltage divider resistor $R_{DP}$ connected to the fourth node D4 to clamp down the voltage of the second side of the voltage divider resistor $R_{DP}$ on a second preset voltage VC2 (0.1V-2.5V, preferably 1V), where the first preset voltage is higher than the second preset voltage.

In particular, the purpose of setting the first clamping circuit 424 is to suppress the highest voltage on both sides of the divider resistor at the first preset voltage corresponding to the first clamping circuit 424, that is, the maximum voltage of the divider resistor can only rise up to the first preset voltage. Similarly, the purpose of setting the second clamping circuit 425 is to clamp down the minimum value of the voltage on both sides of the divider resistor to the second preset voltage corresponding to the second clamping circuit 425, so that the voltage of the divider resistor can drop at most to the second preset voltage. In other words, the voltage on both sides of the divider resistor $R_{DP}$ is limited between the first preset voltage VC1 and the second preset voltage VC2 through the first clamping circuit 424 and the second clamping circuit 425, thus defining the upper and lower limit of $T_{ON}$ change of the flyback converter. As such, the first clamping circuit 424 and the second clamping circuit 425 are set according to the requirements of the variation range of the on time of the flyback converter. Specifically, the first preset voltage Vc1 is used to limit the on time for the main switch operating at the first switching frequency, which is the longest on time of the main switch. Correspondingly, the second preset voltage Vc2 is used to limit the on time for the main switch operating at the second switching frequency, which is the shortest on time of the main switch.

In the present invention, the first preset voltage is 2V, the second preset voltage is 1V, the constant current source I=100 nA, the first capacitor C1=2 pF, the second capacitor C2=1 pF, the first preset multiple K is 2 µA/V, the second preset multiple M is 1, and the offset current $I_{offset}$ is 1 µA. These preferred circuit parameters are taken as examples to form the conduction adjustment unit. As shown in the linear curve of the $T_{ON}$ change rate (the change rate is the ratio of the current on time and the initial on time) depending on switching period in FIG. 6, due to the $T_{ON}$ control by the conduction adjustment unit, the on time of the flyback converter results in linear variation at change rate not higher than 1 (determined by the first clamping circuit 424) and not lower than 0.5 (determined by the second clamping circuit 425). Specifically, the initial on time is proportional to the first preset voltage (2V) of the first clamping circuit. When the switching period TS is less than 10 µs (equivalent to the first switching frequency of 100 kHz), the current flowing into the current mirror 422 is I1=0. At this time, the voltage connecting the fourth node D4 of the divider resistor is clamped at the upper voltage limit of 2V. Therefore, the change rate is 2V/2V=1 and the on time remains $T_{ON}$ without change. When the switching period TS is greater than 50 µs (equivalent to the second switching frequency of 20 kHz), the difference between the first preset voltage and M*I1*RDP is less than the second preset voltage. At this time, the voltage of the fourth node D4 is clamped at the lower voltage limit of 1V, so the change rate is 1V/2V=0.5, and the on time is 0.5 Ton. Therefore, according to the first preset voltage and the second preset voltage, the on time of the main switch of the flyback converter can be controlled to vary continuously between Ton and (vc2/Vc1) Ton in response to the change of the output load when the main switch operates between the first and the second switching frequencies preset for the flyback converter. And the on time of the main switch controlling the flyback converter is fixed at Ton when the main switch operates in a range higher than the first switching frequency, where the first switching frequency is higher than the second switching frequency. Moreover, the circuit parameters in the conduction adjustment unit can be reasonably selected, so that when the main switch operates between the first and the second switching frequencies, the on time varies linearly with the switching period.

Due to different circuit requirements, the setting of circuit parameters in the above-mentioned conduction adjustment unit will be different, but the basic conduction adjustment principle is as described above, that is, the on time of the flyback converter can be adjusted to vary linearly with the switching period within a set range by using the conduction adjustment unit, and there will be no obvious output voltage ripple.

As a result, in the technical scheme of the invention, the flyback converter controls the on operation of its main switch through the main controller at the primary side or the secondary side. The main controller compares the current and/or voltage of the flyback converter with a reference voltage $V_{REF\_ON}$ and then outputs a turn-on control signal to control the on time of the main switch.

Accordingly, the gate control signal is sent to the conduction adjustment unit, which controls the on operation of the first charging branch according to the gate control signal, so as to control a constant current source to charge the first capacitor C1 or discharge from the first capacitor C1 to the second capacitor C2. The voltage $V_{SH}$ flowing through the second switch S2 is converted to current by the converter 421 and then amplified by the current mirror 422, and finally output as the reference voltage $V_{REF\_ON}$ through the divider resistor $R_{DP}$ and transmitted to the main controller, so that the reference voltage $V_{REF\_ON}$ is adjusted with the switching period of the main switch, which causes the on time of the main switch to vary linearly.

In the present invention, either the controller at the primary side or at the secondary side of the flyback converter can be used as the main controller to control the turn-on of the main switch. A plurality of different examples showing the linear control of the on time of the main switch are described in detail as follows.

Example 1

Figure 1:
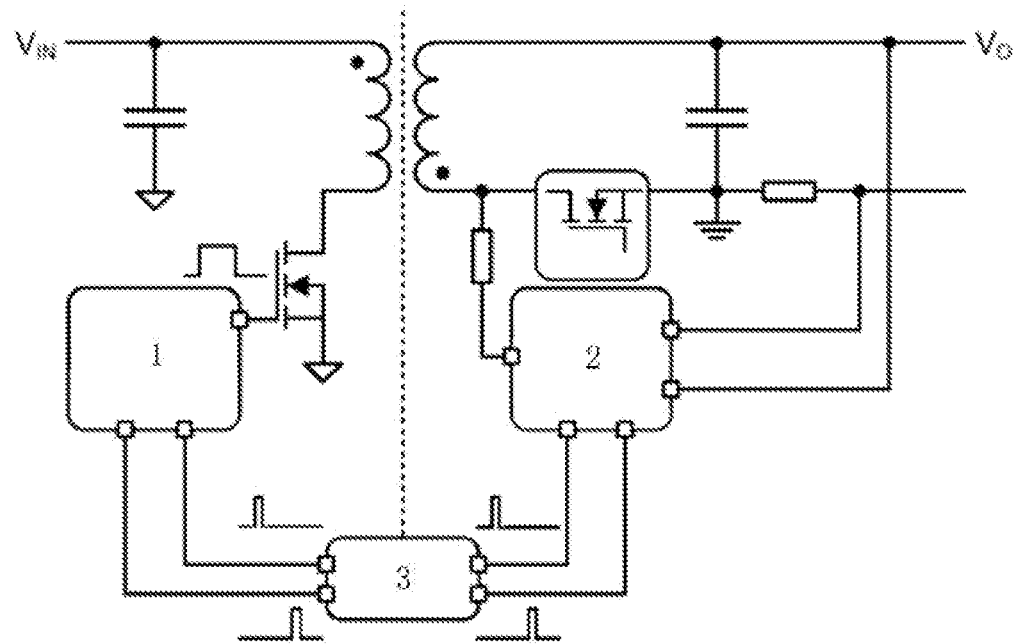
FIG. 1 is the circuit configuration diagram of flyback converter.
Figure 2:
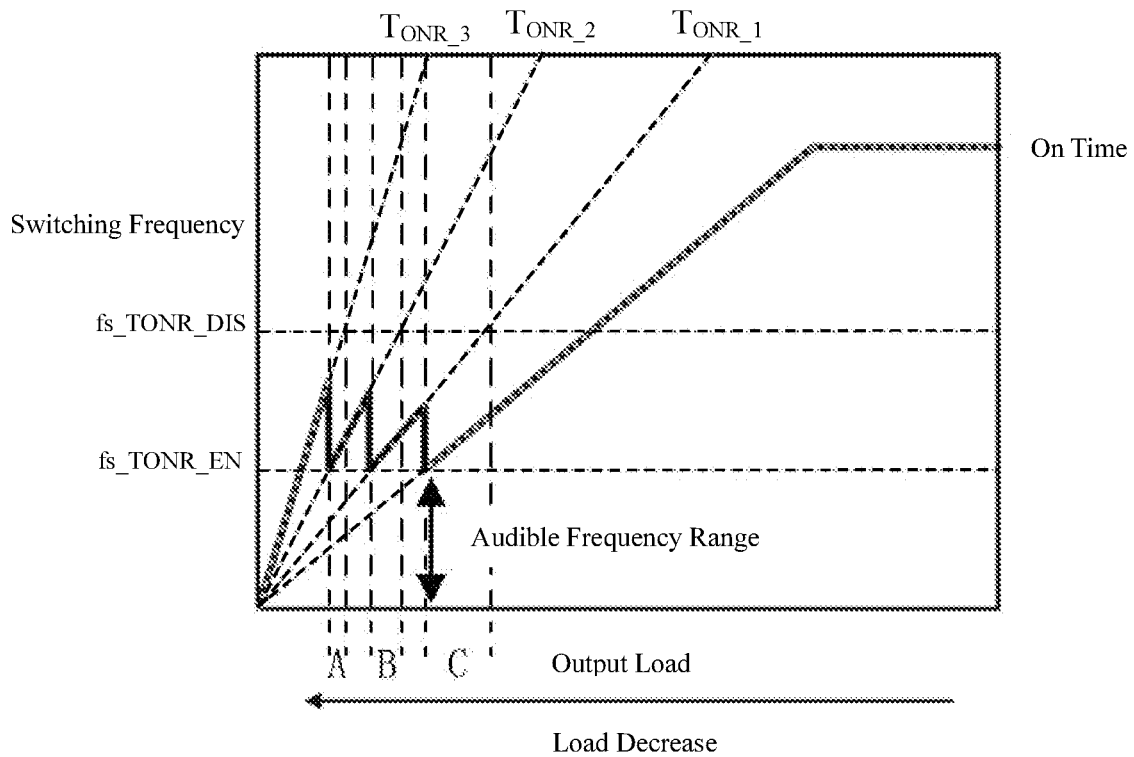
FIG. 2-3 are the chart relationship between the output load and the switching frequency of the flyback converter in the prior art when adjusting the on time.
Figure 3:
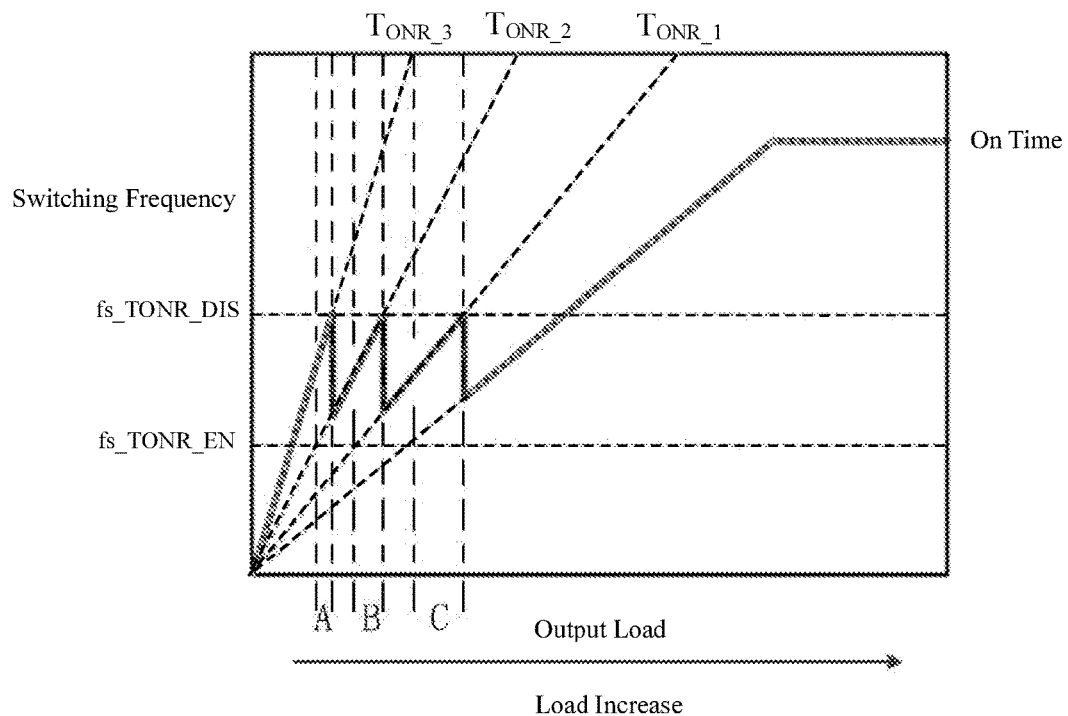
Figure 7:
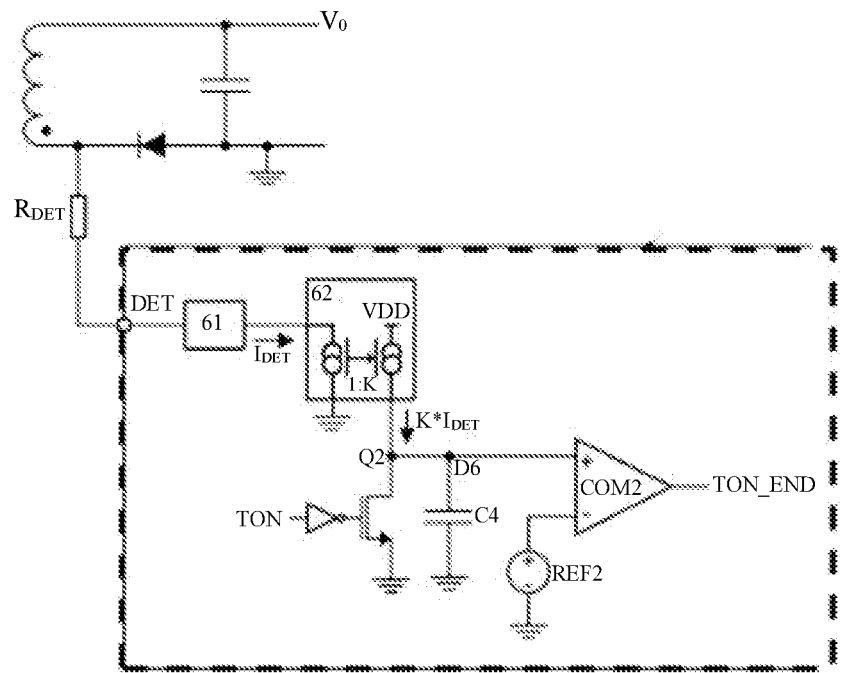
FIG. 7 is a schematic diagram of the circuit configuration of the controller at the secondary side of the flyback converter when the controller on the secondary side of the flyback converter is used as the main controller in examples of the present disclosure.

In this example, the controller at the secondary side of the flyback converter is the main controller, which is the most common control mode in the flyback converter in the prior art. One end of the primary coil on the primary side of the flyback converter is connected to the input terminal of the flyback converter, the other terminal is connected to the drain of the main switch, and the gate of the main switch is connected to the controller at the primary side (as shown in FIG. 1). The secondary coil on the secondary side of the flyback converter is coupled with the output end of the flyback converter, and the main controller is coupled to the secondary side and connected to the controller on the primary side through an Isolator. As shown in FIG. 7, the main controller (controller on the secondary side) includes a receiving module 61 having the input terminal connected to the secondary coil through a detection resistor $R_{DET}$ to detect the current of the secondary coil. The receiving module 61 includes a sample and hold circuit (Sample/Hold) having the input end connected to the detection resistor $R_{DET}$, and the output end connected to the second amplification module 62, which is used to amplify the circuit signal flowing through the detection resistor $R_{DET}$ and output $I_{DET}$.

The main controller also includes a second amplification module having the input end connected to the output end of the receiving module 61, which is used to amplify the current output from the receiving module 61 by a fourth predetermined multiple before output. The second amplification module 62 can be a current mirror, which is used to amplify the circuit signal output by the receiving module 61 by a preset multiple K, and then output to form $K*I_{DET}$. The value range of K is 0.1 m-10 m, preferably 2 m.

The main controller also includes a second field effect transistor Q2 having the gate receiving the gate control signal from the main switch at the primary side through a reverser, the drain connected to the first input terminal of the second comparator COM2 through a sixth node D6, and the source being grounded.

The main controller also includes a fourth capacitor C4 having one end connected to the first input terminal of the second comparator COM2 through the sixth node D6 and the other end grounded.

The main controller also includes a second reference terminal REF2 connected to the reverse input terminal of the second comparator COM2 to provide a reference voltage $V_{REF\_ON}$, reference voltage $V_{REF\_ON}$ being the reference voltage output from the conduction adjustment unit. The output terminal of the second comparator COM2 is connected to the output terminal of the main controller. When the voltage value of the first input terminal of the second comparator COM2 is greater than the reference voltage $V_{REE\_ON}$, the output terminal of the second comparator outputs a switch-on control signal, and the switch-on control signal output by the main controller is transmitted to the primary side controller through the Isolator for the primary side controller to conduct conduction control on the main switch.

The second amplification module 62, the second FET Q2 and the 4$^{th}$ capacitor C4 constitute the input unit of the main controller. The second comparator COM2 form the comparison unit of the main controller.

In this example, the control unit at the secondary side of the flyback converter is used as the main controller of the flyback converter, where the input terminal of the main controller is connected to the circuit of the secondary side to collect the circuit signal of the secondary side through a detection resistor $R_{DFT}$. After passing through a sample and hold circuit and a current mirror, the circuit signal $K*I_{DET}$ at the secondary side is then input to the second comparator COM2, which is compared with the reference voltage $V_{REE\_ON}$ output from the conduction adjustment unit before the switch-on control signal is output. The switch-on control signal is then transmitted to the controller at the secondary side through the Isolator so as to enable switch-on control of the main switch of the flyback converter by the controller at the secondary side.

Example 2

In this example, the controller at the primary side of the flyback converter functions as the main controller, which is different from the case where the controller at the secondary side is used as the main controller in the prior art.

Figure 8:
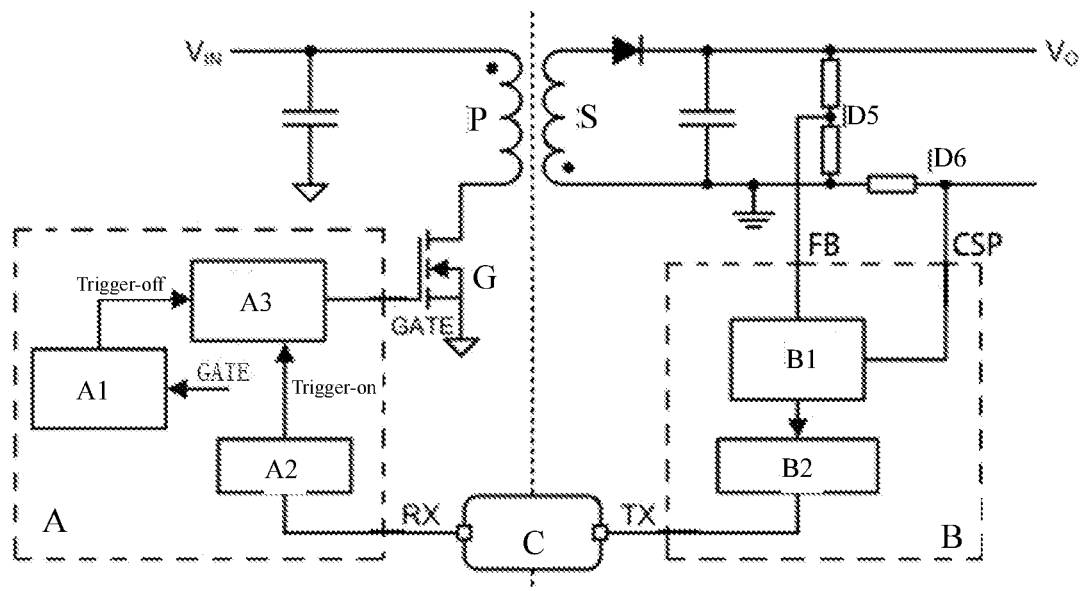
FIG. 8 is the overall circuit diagram of the flyback converter when the controller at the primary side of the flyback converter is used as the main controller in examples of the present disclosure.

The general circuit configuration of the flyback converter is shown in FIG. 8. One end of the primary coil P on the primary side of the transformer of the flyback converter is connected to the input terminal VIN of the flyback converter, and the other end is grounded through a main switch G A gate of the main switch is connected as the output end of the controller A on the primary side of the main controller, receives the gate control signal (GATE) output from the controller A, and controls the switch-on and off of the main switch G functioning as the switch of the flyback converter. One end of the secondary coil S on the secondary side of the transformer of the flyback converter is connected directly or via a diode to the output terminal VO of the flyback converter, and the other end is connected to a reference ground potential at the secondary side. The controller B of the secondary side is coupled to the secondary side to obtain the output information of the flyback converter and generate a first control signal.

The controller A on the primary side includes a control unit A1, a receiving unit A2 and a driving unit A3. An input end of the receiving unit A2 is connected to the controller B on the secondary side through an Isolator C and receives the first control signal sent by the controller B on the secondary side through the Isolator C. An output end of the receiving unit A2 outputs the first control signal and is coupled to the driving unit A3 as a Trigger-on signal to trigger the driving unit A3 to output gate control signal to control the switch-on of the main switch G The control unit A1 in the controller A on the primary side receives the gate control signal sent by the driving unit A3, and after a constant on-time $T_{ON}$, outputs a second control signal, which is coupled to the driving unit A3 as a Trigger-off signal to trigger the driving unit A3 to output the gate control signal to control the main switch G to be disconnected.

Figure 9:
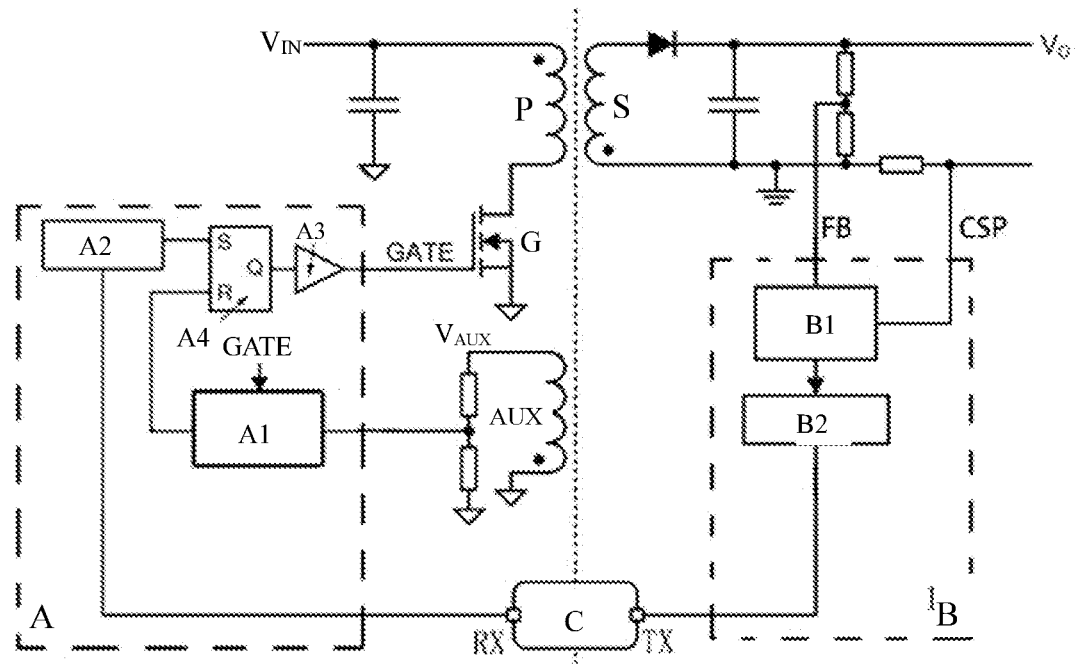
FIGS. 9-23 are schematic diagrams of various circuit configurations of the controller at the primary side of the flyback converter in examples of the present disclosure.

Further, as shown in FIG. 9, the first input end of the control unit A1 is connected to a first voltage terminal, the second input end of the control unit A1 is connected to the gate control signal GATE of the main switch G, and the output end of the control unit A1 is connected to the reset terminal R of the trigger A4. Based on the circuit connection, the control unit A1 obtains a second control signal and outputs it to the reset terminal R of the trigger A4 by processing the first voltage input from the first voltage terminal and the gate voltage of the main switch, where the first voltage at the first voltage terminal is proportional to the input voltage VIN at the input terminal of the flyback converter.

The receiving unit A2 is connected between the Isolator C and the reset terminal S of the trigger A4 used to output the first control signal to the set terminal S of the trigger A4. The output terminal Q of the trigger A4 is connected to the gate of the main switch G via a driving unit A3. When the receiving unit A2 outputs the first control signal to the set terminal S of the trigger A4, the driving unit A3 drives the main switch G to turn on, thus driving the flyback converter to enter the switch-on phase, and when the control unit A1 outputs the second control signal to the reset terminal R of the trigger A4, the driving unit A3 drives the main switch G to turn off, thus driving the flyback converter to enter the switch off stage. Further, when the main switch G is on, the control unit A1 obtains and outputs a second control signal by processing the first voltage, and when the main switch G is turned off, the control unit A1 does not output a second control signal. Based on the above description, the working principle of the flyback converter using controller A on the primary side as the main controller is that when the flyback converter is in the switch on stage, the coil P on the primary side is directly connected to the circuit of the input voltage, and the current in coil P on the primary side and the magnetic field in the magnetic core of the transformer increase and energy is stored in the magnetic core. The voltage generated in the secondary coil S is reversed, so that the diode on the S side of the secondary coil is in the reverse bias state and cannot be conducted. The capacitor on the S side of the secondary coil supplies voltage and current to the load.

Furthermore, the control unit A1 can obtain the first voltage from the first voltage terminal and the gate voltage from the main switch G Therefore, after processing the $T_{ON}$ for a period of time, the control unit A1 can output the second control signal (high level signal) to the reset terminal R of the trigger A4, so that the output terminal Q of the trigger A4 outputs a low-level signal, which is stepped down by the gate voltage of the main switch G controlled by the driving unit A3, so that the main switch G is turned off, and the flyback converter enters its switch-off phase.

When the flyback converter is in the switch off phase, the current flowing through the main switch G is 0 and the magnetic field in the core begins to decrease. At this time, a positive voltage is induced on the coil S of the secondary side, and the diode on the S side of the coil at the secondary side is in a positive bias state and is turned on. The conduction current flows into the capacitor and load on the S side of the coil on the secondary side, as such the energy stored in the magnetic core is transferred to the capacitor and load.

At this time, the control unit A1 is unable to obtain the first voltage from the first voltage terminal and the gate voltage from the main switch G so it does not perform circuit processing. Since the diode on the S side of the secondary coil is turned on, the secondary side controller B can receive the signal and send it to the receiving unit A2 in the primary side controller A through the Isolator C. The receiving unit A2 correspondingly outputs the first control signal (high-level signal) to the set terminal S of the trigger A4, so that the output terminal Q of trigger A4 outputs a high-level signal, which is stepped up by the gate voltage of the main switch G controlled by the driving unit A3, so that the main switch G is turned on, and the flyback converter enters its switch-on phase.

The above described two phases operate in turn, thus forming the working process of the flyback converter in the present invention. Compared with example 1 with the controller at the secondary side used to realize the switch-on control of the main switch, in this example the controller at the primary side is used to calculate and control the on time of the main switch, so that the input voltage at the primary side and other related information are easy to obtain, thus significantly reducing the computing complexity and resulting in no influence on the detection of the synchronous rectifier in the system. In addition, the calculation process of on time is placed in the primary side, so that calculation and transmission of instructions to the primary side by the secondary side can be avoided. The secondary side controller only needs to transmit the switch-on signal to the primary side controller, which saves a transmission line and avoids transmission errors. Therefore, it is unnecessary to set the blanking time for switch on/off in the system, so that the flyback converter in the present invention can be applied in scenarios with high switching frequency, and the scope of application of the flyback converter is extended.

Figure 10:
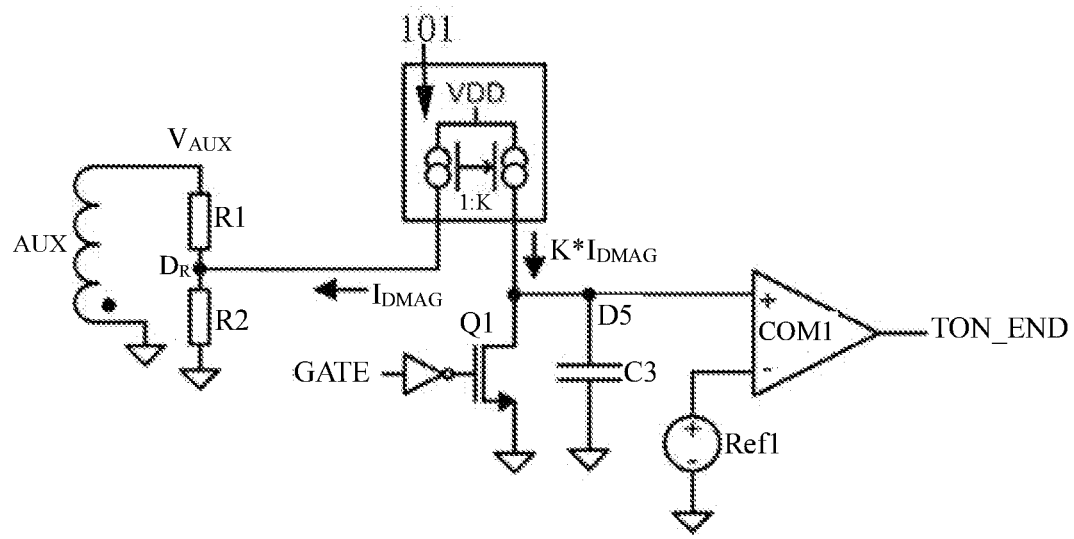

The typical circuit configuration of a primary side control unit A1 in a flyback converter operating in discontinuous conduction mode (DCM) is described. As shown in FIG. 10, the control unit A1 includes a first amplification module 101 having the input terminal connected to the first voltage terminal and the output terminal connected to the positive phase input terminal of a first comparator via a 5th node D5, where the first amplification module Mirror1 is used to amplify the current flowing through first amplification module 101 by a $3^{rd}$ preset multiple K and then output it.

The control unit A1 further includes a first FET Q1 having a gate connected to the gate of the main switch via a reverser, a drain connected to the positive phase input terminal of the first comparator COM1 via the 5th node D5, and the source being grounded.

The control unit A1 further includes a third capacitor C3 having one end connected to the positive phase input terminal of the first comparator COM1 through the fifth node D5 and the other end being grounded.

The control unit A1 further includes a first reference terminal REF1 connected to the inverting input end of the first comparator COM1 to provide a reference voltage. The output end of the first comparator COM1 is connected to the output end of the control unit A1.

When the voltage value of the positive phase input terminal of the first comparator COM1 is greater than the reference voltage $V_{REF\_ON}$ provided by the conduction adjustment unit, the output end of the first comparator outputs a second control signal. In this circuit configuration, the first voltage terminal is connected to an auxiliary coil AUX through a first resistor R1, and there is a predetermined turn ratio between the auxiliary coil AUX and the primary side coil P, so that the first voltage $V_{AUX}$ is proportional to the input voltage $V_{IN}$ of the input terminal of the flyback converter.

In this type of circuit configuration, the first amplification module is actually a current mirror, which amplifies the input current by a third predetermined multiple K and then outputs. The current mirror is further connected to an external voltage VDD, which will not be repeated here.

In this example, when the flyback converter is in the switch on phase, the first amplification module receives the demagnetized current ($I_{DMAG}$) transmitted through the first voltage terminal, which is detected by the current detection pin of an auxiliary winding. Then the first amplification module 101 amplifies the demagnetized current by a third predetermined multiple K ($K^*I_{DMAG}$) and outputs it to the positive phase input terminal of the first comparator COM1. The third predetermined multiple K is a fixed value, ranging from (0.001, 0.1), preferably 0.01. Accordingly, the first reference terminal REF1 continuously inputs the reference voltage $V_{REF\_ON}$ provided by the conduction adjustment unit to the inverting input end of the first comparator COM1, and the first comparator COM1 continually compares the input signal from the positive and inverting input terminals. When the input signal from the positive phase input terminal is higher than the first reference voltage of the inverting input terminal, the output end of the first comparator COM1 outputs a high level signal as the second control signal ($T_{ON\_END}$).

In other words, based on the circuit configuration of the control unit A1 and the signal processing process, the on time ($T_{ON}$) of the flyback converter depends on the K times of demagnetized current ($K^*I_{DMAG}$), capacitance value of the first capacitor C1 and the reference voltage $V_{REF\_ON}$. According to the above description, the conduction adjustment unit adjusts the reference voltage $V_{REF\_ON}$ according to the switching period of the main switch. Therefore, the on time of the main switch changes linearly, which reduces the output voltage ripple caused by the sudden change of on time.

Further, in this example, the resistance value of the first resistance R1 can be determined by the following formula:

$$R1 = \frac{N_A}{N_P} \cdot K \cdot \frac{1}{C \cdot V_{REF\_ON} \cdot \sqrt{\frac{f_s}{2 \cdot L_m \cdot P_O}}}$$

Where:
Na is the number of winding turns of the auxiliary winding AUX;
NP is the number of winding turns of the primary coil P.

Alternatively, in this example, still as shown in FIG. 10, there is a connection node $D_R$ between the first voltage terminal and the first resistor R1. Therefore, the flyback converter further includes a second resistor R2, the second resistor R2 being connected between the connection node $D_R$ and the grounding terminal. The second resistor R2 can be selectively configured according to the actual situation, and will not be repeated here.

Figure 11:
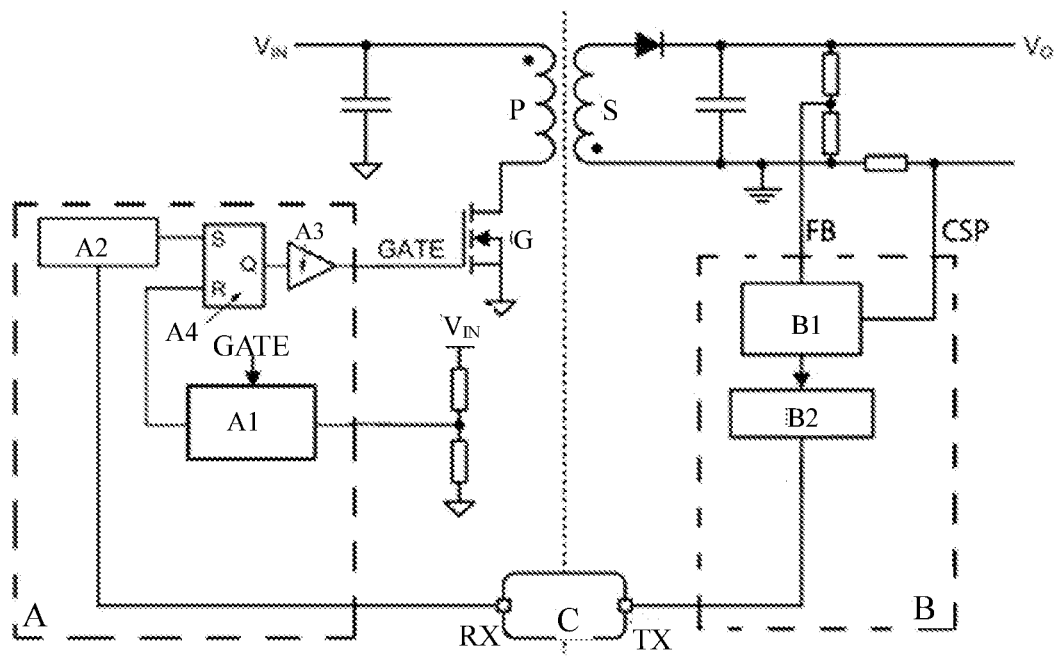
Figure 12:
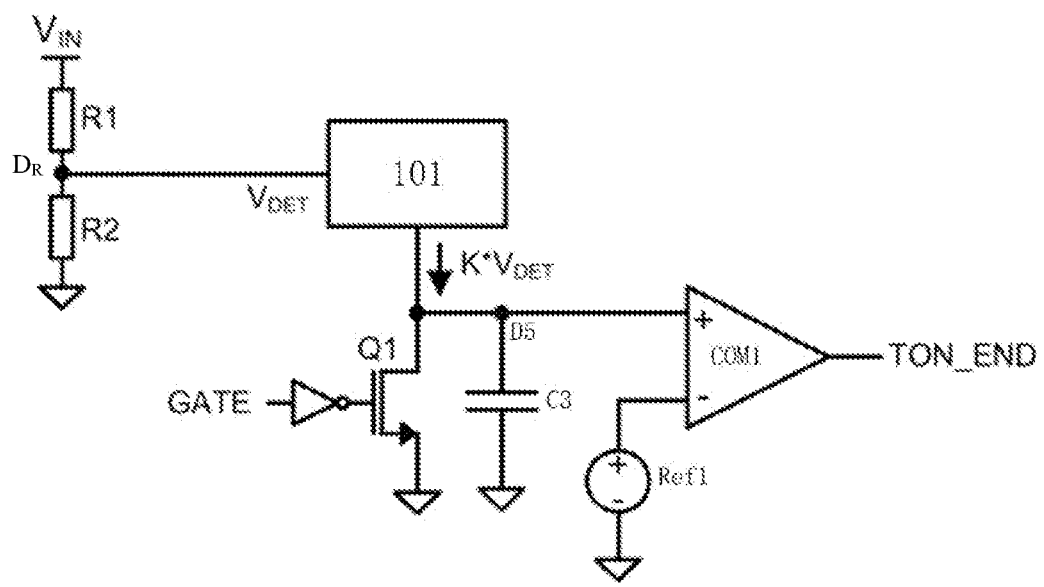

In this example, another typical circuit configuration of flyback converter working in DCM mode is shown in FIG. 11-12. The difference between this circuit configuration and that shown in FIG. 9-10 is as follows:

1) The first voltage generated by the first voltage terminal is no longer the voltage proportional to the input voltage $V_{IN}$ generated by the auxiliary winding AUX, but the first voltage $V_{DET}$ proportional to the input voltage $V_{IN}$ by directly detecting the input voltage $V_{IN}$.

2) The first amplification module 101 in this example is no longer a current mirror, but a voltage to current module (V-to-I Converter), which converts the first voltage $V_{DET}$ into $K*V_{DET}$ by a third predetermined multiple K and outputs it.

3) The third preset multiple K in this example can be obtained by the forgoing formula.

$$K = \frac{I_{OUTPUT}}{V_{INPUT}}$$

Where:
$I_O$ is the output current of the first amplification module 101;
$V_I$ is the input voltage of the first amplification module 101.
Further, the value of the first preset multiple K can be 0.1 μA/V~100 μA/V, preferably 2 μA/V.

4) The second resistor R2 in this example is a required circuit component, and the resistance relationship between the first resistance R1 and the second resistance R2 can be determined by the following formula:

$$\begin{cases} \text{gain} = C \cdot V_{REF\_ON} \cdot \sqrt{\frac{f_s}{2 \cdot L_m \cdot P_O}} \\ \text{gain} = \frac{R2}{R1+R2} \cdot K \end{cases}$$

Where:
gain represents the theoretical value of gain;
C represents the resistance of the first capacitor C1;
$V_{REE\_ON}$ represents the voltage value of the first reference voltage;
$f_s$ represents the switching frequency of the main switch;
$L_M$ represents the inductance value of the Primary Coil;
$P_O$ represents the output power at the secondary side;
R1 represents the resistance of the first resistor;
R2 represents the resistance of the second resistor;
K represents the first preset multiple, which is calculated as per the forgoing formula (1).

Figure 13:
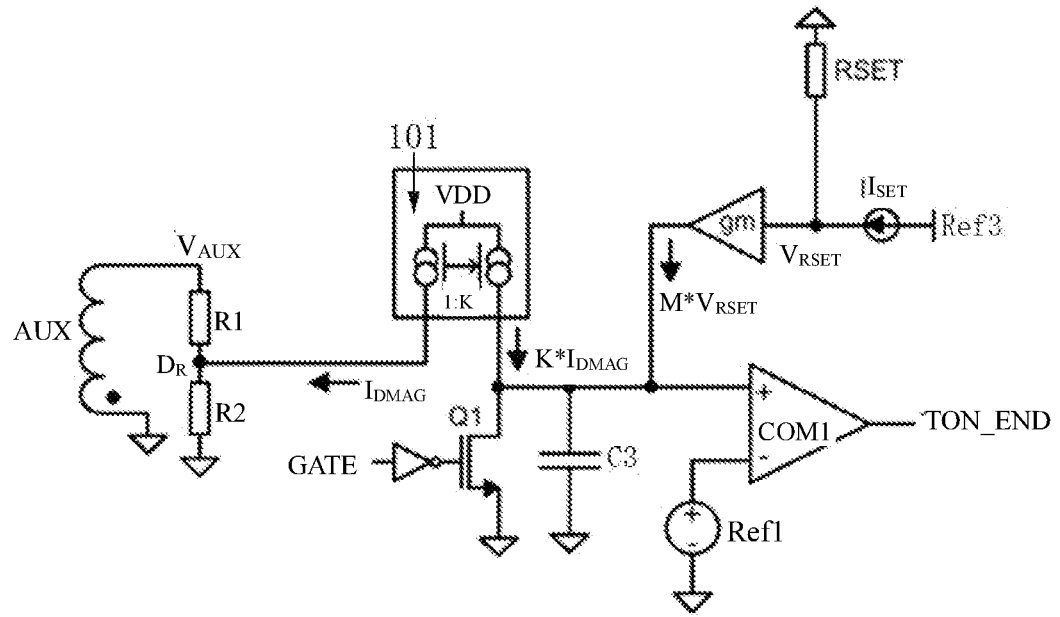

Accordingly, when the flyback converter operates in continuous conduction mode (CCM), and the primary side controller is used as the main controller of the flyback converter, a typical circuit configuration is shown in FIG. 13. Different from the circuit configuration in FIG. 10, in this circuit configuration there is a set voltage terminal, which includes a reference resistor $R_{SET}$ and a set current terminal Ref3, and are respectively connected to the input terminal of a reference module. The reference resistor $R_{SET}$ has a predetermined resistance value, and the set current terminal Ref3 has a predetermined input current $I_{SET}$.

The reference module includes an amplifier gm having an input end used as the input end of the reference module and an output end connected to the first comparator COM1. The amplifier gm is used to amplify the output voltage of the set voltage terminal according to a fifth predetermined multiple M and then output.

In this circuit configuration, a reference input voltage $V_{RSET}$ is obtained by setting the input current $I_{SET}$ and $R_{SET}$ at the set voltage terminal, which is processed by the amplifier gm and then amplified by the fifth predetermined multiple M to form $M*V_{RSET}$ and output for comparison.

The value range of the fifth predetermined multiple M can be 0.1 μA/V~100 μA/V, preferably 1 μA/V.

The value range of the reference voltage $V_{RSET}$ sent from the set voltage terminal can be 0.1V~5V, preferably 0.65V.

The resistance value of the foregoing reference resistance RSET can be 0Ω~10 kΩ.

Figure 14:
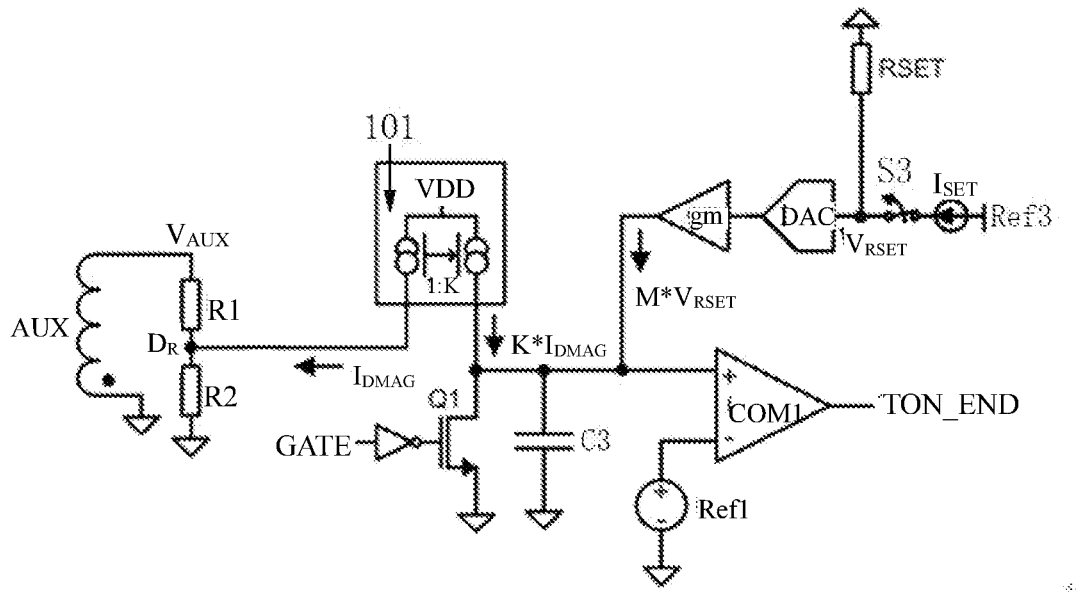
Figure 15:
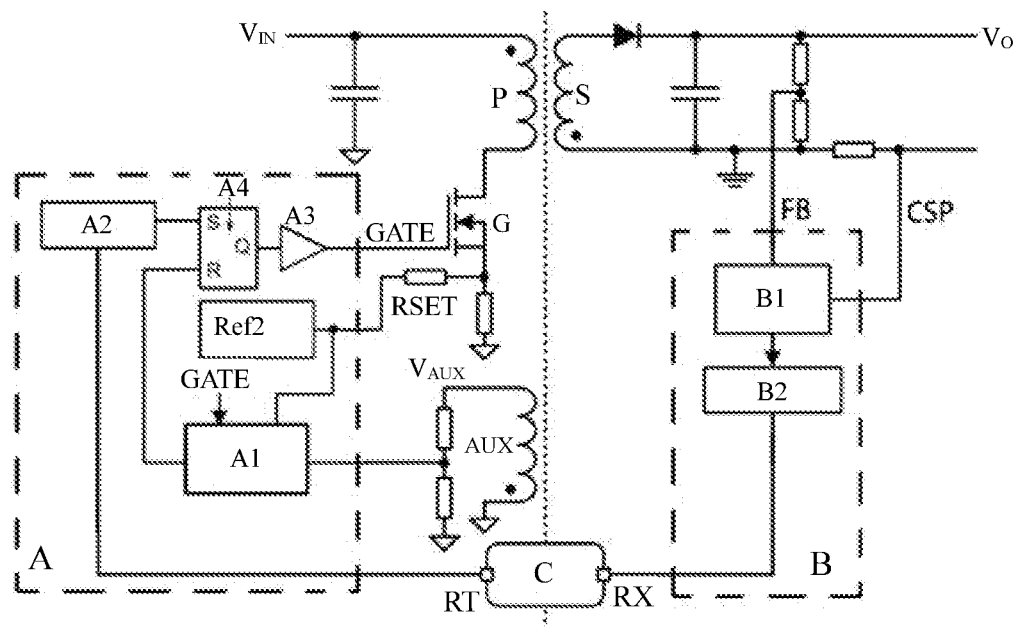

Then the input signal of the positive phase input terminal of the first comparator COM1 depends on the capacitance value C of the third capacitor C3 and the reference voltage $V_{REF\_ON}$, the working principle of which is the same with that of the circuit configuration described in the forgoing paragraphs. That is, when the flyback converter is in the switch on stage, the control unit A1 starts to work. When the input signal of the positive phase input terminal of the first comparator COM1 is greater than the reference voltage $V_{REF\_ON}$ of the inverting input terminal, the output terminal of the first comparator COM1 outputs a second control signal (high-level signal) to control the main switch G to turn off, and the flyback converter enters the switch off phase. Further, on the basis of FIG. 13, as shown in FIG. 14, a switch S3 is arranged at the set voltage terminal. Therefore, the set voltage terminal can be locked in the actual system operation process. The specific working principle is as follows: first, turn on switch S3, and set input current $I_{SET}$ at the set current terminal Ref3; then, turn off switch S3, and the input voltage is locked and stored in DAC. The advantage of this is that since the input voltage $V_{RSET}$ can be locked in the DAC, it is no longer necessary to lead out an additional pin to set the reference resistance $R_{SET}$. The reference resistance $R_{SET}$ can be directly connected to the original pins in the system (for example, the case shown in FIG. 15).

Figure 16:
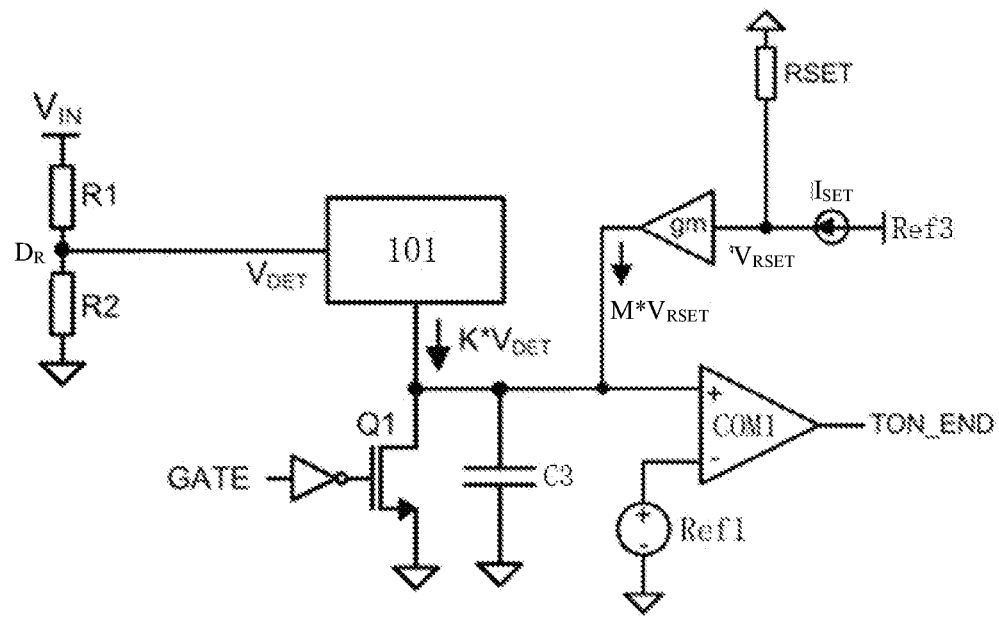

In this example, the flyback converter similarly operates in CCM. Another typical circuit configuration is shown in FIG. 16, and the general circuit configuration can refer to FIG. 11.

The difference between this circuit configuration and the circuit configuration shown in FIG. 13 is that the auxiliary winding voltage $V_{AUX}$ at the first voltage terminal is no longer provided by the auxiliary coil AUX, but rather, the first voltage proportional to the input voltage $V_{IN}$ is obtained by directly detecting the input voltage $V_{IN}$ at the primary side. The second resistor R2 in this circuit configuration is required. Further, the first amplification module 101 is realized by a V-to-I converter.

In other words, by combining the configuration setting of the first voltage terminal in FIG. 12 with other configuration settings in FIG. 13, the specific configuration of the control unit A1 in this circuit configuration can be obtained. Therefore, in this circuit configuration:

The resistance of the first resistor R1 and the second resistor R2 can be determined by the foregoing formula (3).

The value range of the third preset multiple K can be 0.1 μA/V~100 μA/V, preferably 2 μA/V.

The resistance value of the reference resistor $R_{SET}$ is the same with the setting of RSET of the circuit configuration as shown in FIG. 13.

The fifth preset multiple M is the same with the foregoing paragraphs, the value range of which can be 0.1 μA/V~100 μA/V, preferably 1 μA/V.

Figure 17:
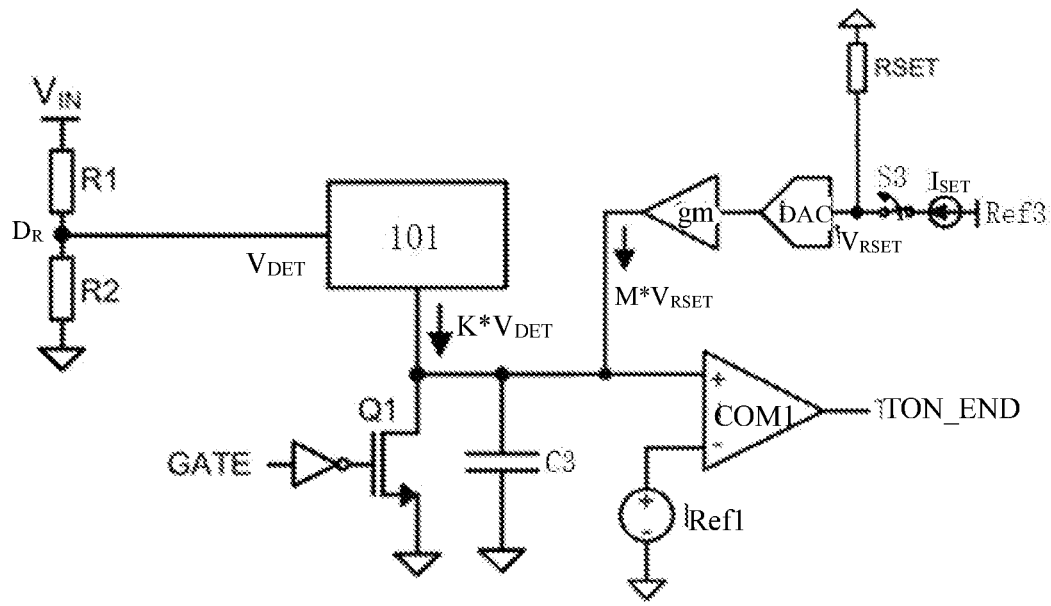

In this example, the flyback converter also works in CCM mode. Another typical circuit configuration is shown in FIG. 17, and its overall circuit framework can refer to FIG. 11. Compared with the circuit configuration shown in FIG. 14-15, the first voltage terminal in this circuit configuration is no longer provided with auxiliary winding voltage $V_{AUX}$ by the auxiliary winding AUX, but instead, obtains the first voltage proportional to the input voltage $V_{IN}$ by directly detecting the input voltage $V_{IN}$ at the primary side. The second resistor R2 is required, and the first amplification module 101 is also realized by the V-to-I converter module.

In other words, the circuit configuration of the control unit A1 in this circuit configuration can be obtained by combining the configuration setting of the first voltage terminal in FIG. 12 with the other configuration settings in FIG. 14. Therefore, in this circuit configuration:

The resistance values of the first resistor R1 and the second resistor R2 can be determined by the foregoing formula (3). The value range of the third preset multiple K can be 0.1 µA/V~100 µA/V, preferably 2 µA/V.

The resistance of reference resistor $R_{SET}$ is the same with the settings of the same configuration in the circuit configuration as shown in FIG. 14.

The 5th preset multiple M is the same with the settings in the foregoing text, the value range of which can be 0.1 µA/V~100 µA/V, preferably 1 µA/V.

Figure 18:
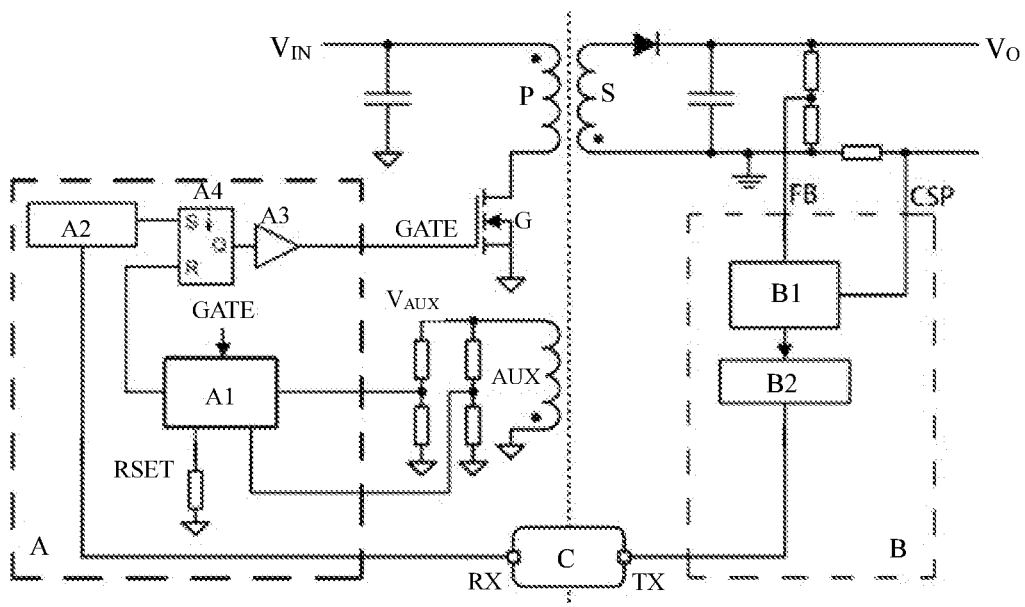
Figure 21:
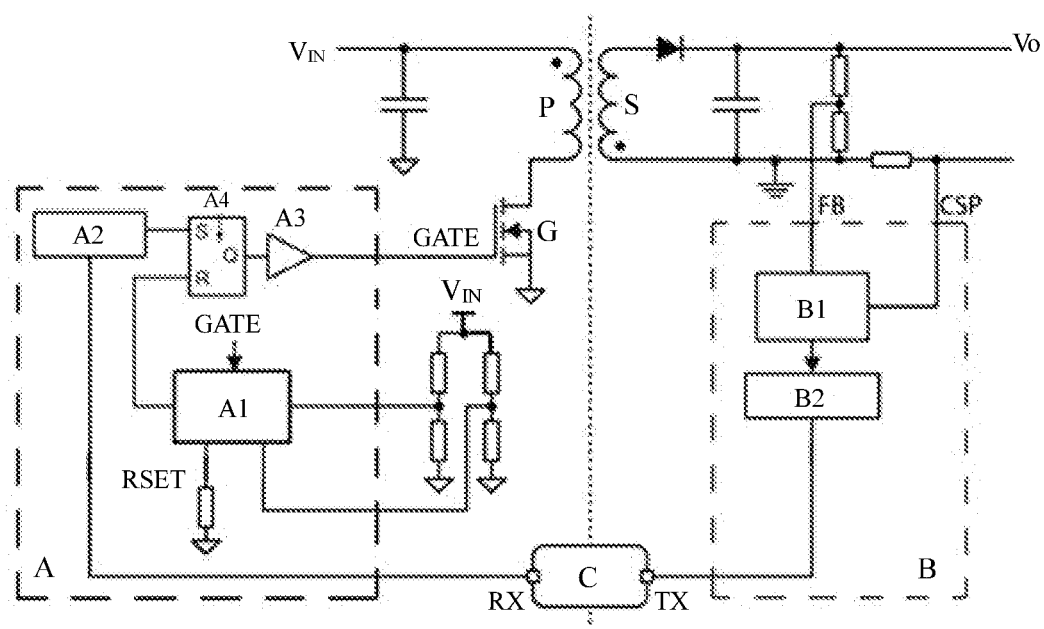

In this example, when the flyback converter supports both DCM and CCM modes, its circuit configuration can be a combination of the above circuit configurations supporting single DCM mode or CCM mode. Specifically, there are two different circuit configurations supporting both DCM mode and CCM mode. The overall circuit diagram of one circuit configuration is shown in FIG. 18. The input terminal of control unit A1 is connected to auxiliary coil AUX, and the input voltage proportional to the voltage $V_{AUX}$ of auxiliary coil AUX is acquired. The overall circuit diagram of another configuration is shown in FIG. 21. The input terminal of control unit A1 is directly connected to the input voltage YIN at the primary side, and the input voltage proportional to $V_{IN}$ is acquired. The two circuit configurations are described in turn below.

Figure 19:
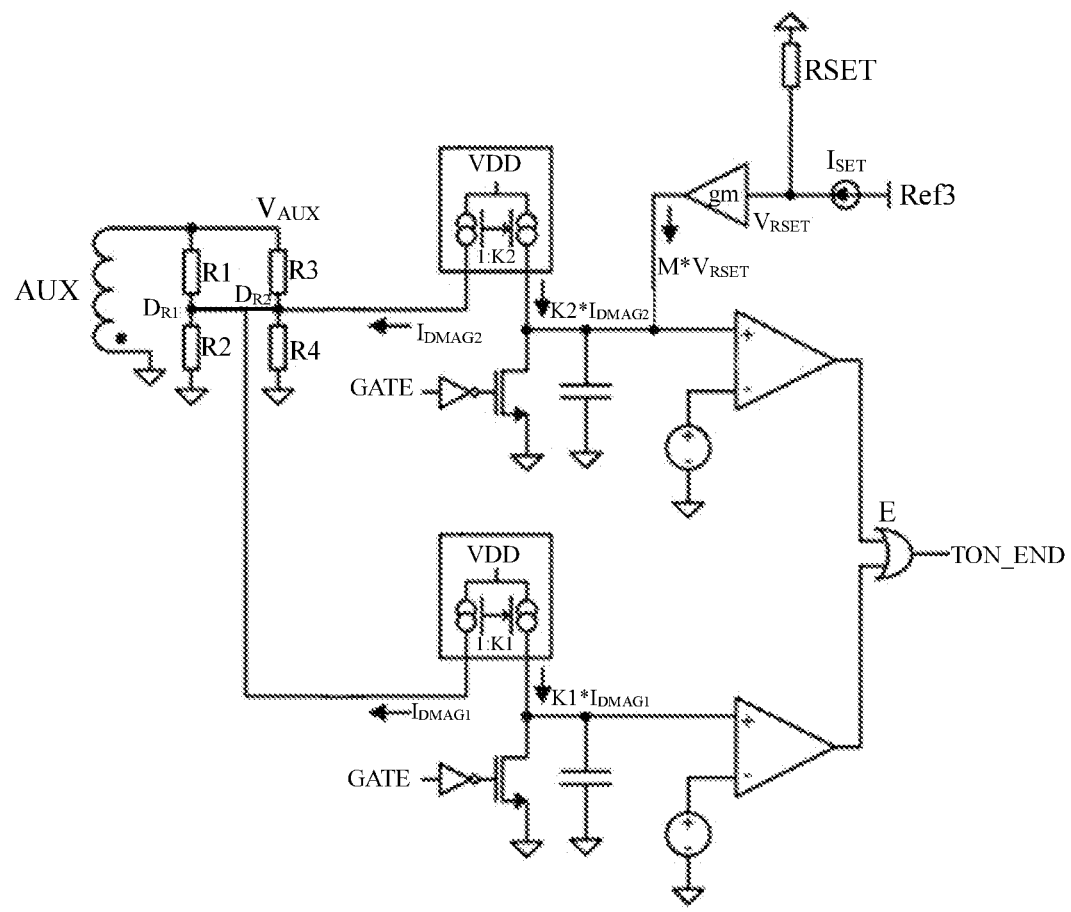

The circuit configuration shown in FIG. 19 is based on FIG. 18, which is actually a circuit configuration obtained by combining FIG. 10 and FIG. 13. In this circuit configuration, the first voltage terminal is connected to auxiliary coil AUX through the first resistor R1, and the auxiliary coil AUX has a predetermined turn ratio with the primary coil P, so that the input voltage of the first voltage terminal is proportional to the input voltage of the flyback converter. The first voltage terminal is also connected to the auxiliary coil AUX through the third resistor R3, and the auxiliary coil AUX has a predetermined turn ratio with the primary coil P, so that the input voltage at the first voltage terminal is proportional to the input voltage at the input end of the flyback converter. There is a first connection node DR1 between the first voltage terminal and the first resistor R1, and the second resistor R2 is connected between the first connection node DR1 and the grounding terminal. A second connection node DR2 is provided between the first voltage terminal and the third resistor R3. The fourth resistor R4 is connected between the second connection node DR2 and the ground terminal. Similar to the example above, the second resistor R2 and the fourth resistor R4 described above are optional.

In the circuit configuration as shown in FIG. 19, one branch circuit is constructed according to the circuit principle in FIG. 10 and finally outputs a branch signal through the comparator. The other branch circuit is constructed according to the circuit principle in FIG. 13 and finally outputs another branch signal through the comparator. Finally, one OR gate circuit module E is used to judge the two branch signals. When one of the two input terminals of the OR gate circuit module inputs a high-level signal, the output end of the OR gate circuit module outputs a second control signal (high-level signal) to drive the main switch G to turn off, thus the flyback converter enters the switch off stage.

In FIG. 19, the value range of the predetermined magnification factor K1 and K2 corresponding to the two current mirrors can be 0.001-0.1, preferably 0.01. The amplification factor M of the amplifier gm can refer to the value range mentioned above and will not be repeated here. $I_{DMAG1}$ and $I_{DMAG2}$ in the figure represent the demagnetized current of two different branches, respectively.

Figure 20:
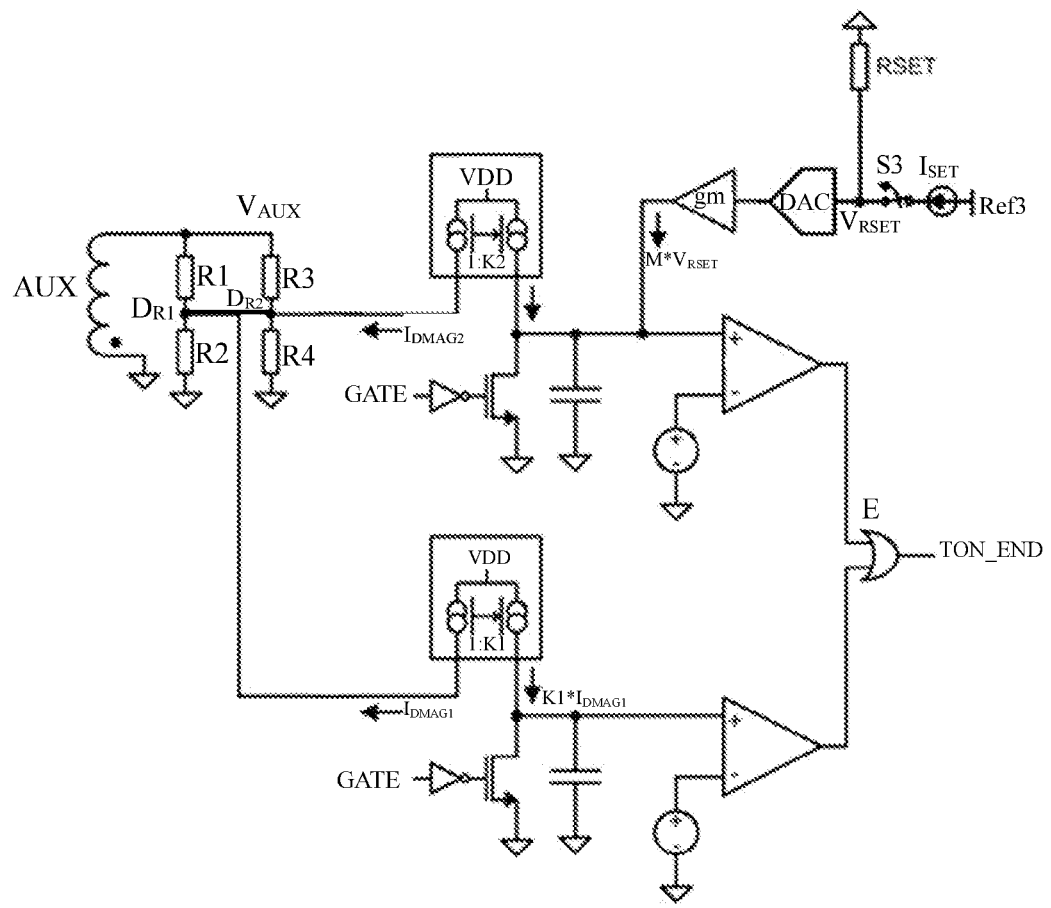

The circuit configuration shown in FIG. 20 is based on the circuit configuration shown in FIG. 19 by adding DAC and switch S3 to form a circuit signal having signal locking function similar to that in FIG. 14. The circuit working principle is realized by combining the circuit working principle in FIG. 19 and FIG. 14, and will not be repeated here.

Figure 22:
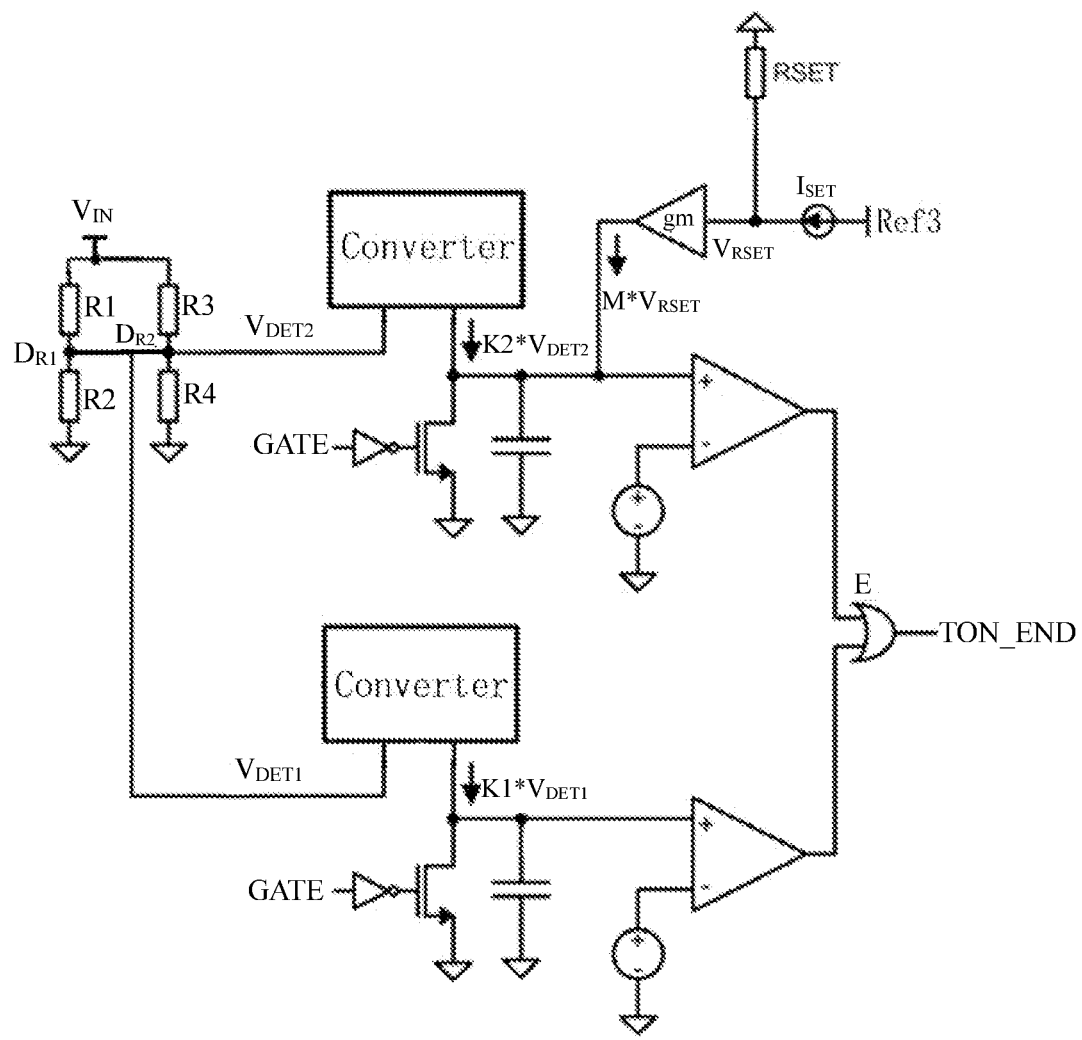

The circuit configuration shown in FIG. 22 is based on FIG. 21, which is actually a circuit configuration obtained by combining FIG. 12 and FIG. 16. In this circuit configuration, the first voltage terminal is connected to the input terminal of the flyback converter through the first resistor R1, so as to make the input voltage of the first voltage terminal is in proportional to the input voltage $V_{IN}$ from the input terminal of the flyback converter. A first connection node DR1 is arranged between the first voltage terminal and the first resistor R1. The second resistor R2 is connected between the first connection node DR1 and the grounding terminal. The first voltage terminal is also connected to the input terminal of the flyback converter through a third resistor R3, so that the input voltage of the first voltage terminal is proportional to the input voltage $V_{IN}$ from the input terminal of the flyback converter. A second connection node DR2 is arranged between the first voltage terminal and the third resistor R3. The fourth resistor R4 is connected between the second connection node DR2 and the grounding terminal.

In the circuit configuration as shown in FIG. 22, one branch circuit is constructed according to the circuit principle in FIG. 12 and finally outputs a branch signal through the comparator. The other branch circuit is constructed according to the circuit principle as shown in FIG. 16 and finally outputs another branch signal through the comparator. Finally, the OR gate circuit module E is used to judge the two branch signals. When one of the two input terminals of the OR gate circuit module inputs a high-level signal, the output terminal of the OR gate circuit module outputs a second control signal (high-level signal) to drive the main switch G to turn off, thus the flyback converter enters the switch off stage.

In FIG. 22, the two V-to-I converters correspond to the magnification factor K1 and K2 respectively, and $V_{DET1}$ and $V_{DET2}$ are the detection voltages input to the two converters respectively. The amplification factor M of the amplifier gm can refer to the value range mentioned above and will not be repeated here.

Figure 23:
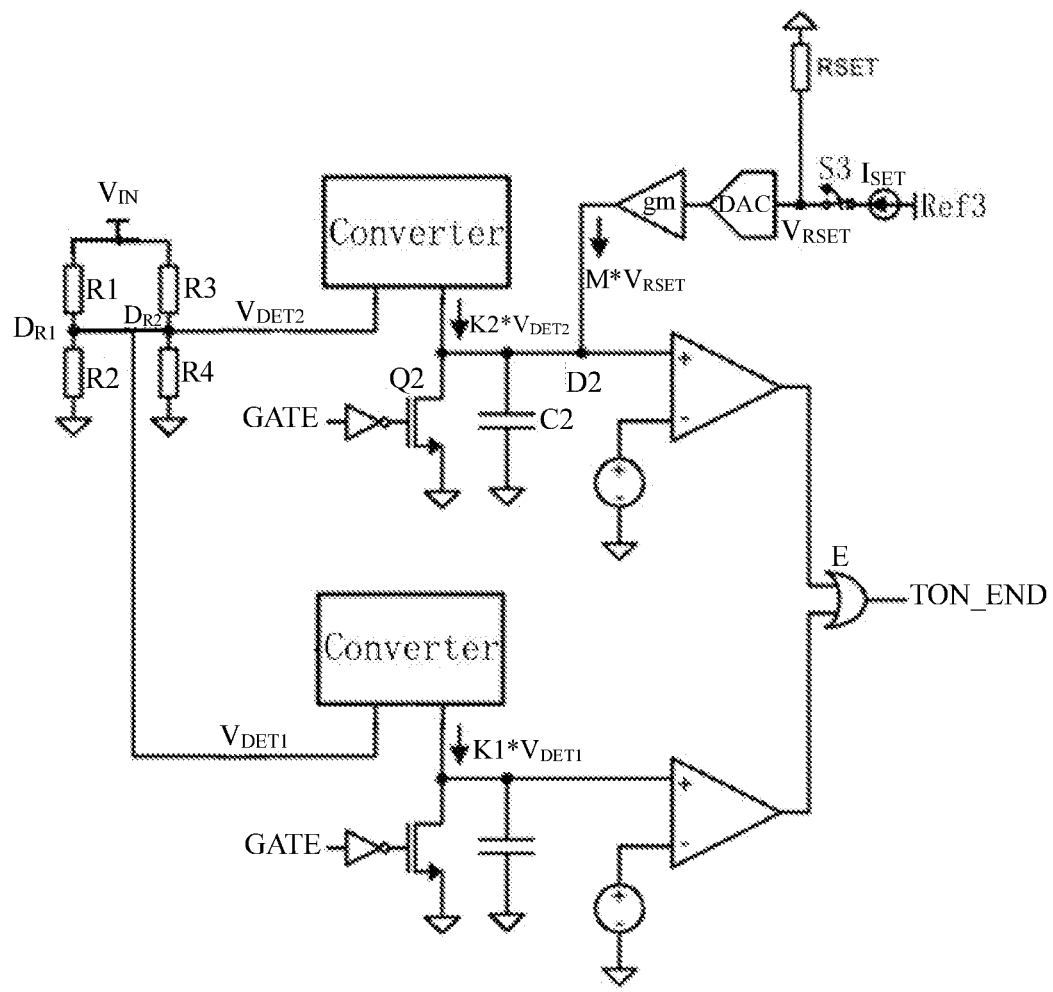

The circuit configuration shown in FIG. 23 is based on the circuit configuration shown in FIG. 22 by adding a DAC and switch S3 to lock and save circuit signal similar to that shown in FIG. 17, the circuit working principle of which is realized by combining the circuit working principle in FIG. 22 and FIG. 17, and will not be repeated here.

In conclusion, in the second example of the invention, the primary side controller is used to calculate and control the on time of the flyback converter, so as to obtain relevant information such as input voltage, reduce the calculation complexity, reduce the transmission line connection between the primary side controller and the secondary side controller, and pose no influence to the detection of the synchronous rectifier in the system. Furthermore, the primary side controller is used to calculate and control the on time of the flyback converter, so there is no transmission error or there is no requirement to set the blanking time of switch on/off in the system, and consequently the flyback converter can be applied to high switching frequency scenarios. Therefore, the flyback converter in example 2 has better circuit performance than the related configurations in the prior art.

Those of ordinary skill in the art may recognize that modifications of the examples disclosed herein are possible. For example, a total number of components of a flyback converter may vary. Other modifications may occur to those of ordinary skill in this art, and all such modifications are deemed to fall within the purview of the present invention, as defined by the claims.

The invention claimed is:

1. A flyback converter comprising:
   a primary side comprising
      a main switch connected in series with a primary coil coupled to an input terminal of the flyback converter, a gate of the main switch receiving a gate control signal to control a current flowing through the primary coil;
   a secondary side comprising
      a secondary coil coupled to an output terminal of the flyback converter for connecting to an output load; and
   a main controller configured to determine an on time of the main switch, the main controller comprising an input unit receiving a detection signal of the flyback converter; and
      a comparison unit comparing an output of the input unit to a reference voltage to generate an on time control signal at an output terminal of the comparison unit to determine the on time of the main switch;
   wherein the flyback converter further comprises a conduction adjustment unit configured to receive the gate control signal and to generate the reference voltage received by the comparison unit;
   wherein the reference voltage is negatively correlated to a switching period of the main switch; and
   wherein the on time of the main switch is adjusted by adjusting the reference voltage.

2. The flyback converter of claim 1, wherein the conduction adjustment unit comprises
   a charge-discharge module configured to receive the gate control signal of the main switch; and
   a voltage amplification module configured to amplify an output voltage of the charge-discharge module to generate the reference voltage.

3. The flyback converter of claim 2, wherein the charge-discharge module performs charge and discharge operations according to the gate control signal of the main switch;
   wherein the output voltage of the charge-discharge module is positively correlated to the switching period of the main switch; and
   wherein the voltage amplification module comprises a divider resistor configured to provide the reference voltage at an output terminal of the voltage amplification module negatively correlated to the output voltage of the charge-discharge module.

4. The flyback converter of claim 3, wherein the charge-discharge module comprises:
   a rising edge trigger configured to receive the gate control signal of the main switch, the rising edge trigger detecting a rising edge of the gate control signal and outputting a first pulse signal to a first node;
   a falling edge trigger connected between the first node and a control terminal of a first switch, the falling edge trigger detecting a falling edge of the first pulse signal and outputting a second pulse signal;
   a first capacitor, the first capacitor and the first switch connected in parallel between a second node and a ground terminal, the second node being further connected to an output terminal of a constant current source, the constant current source and the first switch constituting a first charge-discharge branch, the constant current source and the first capacitor constituting a second charge-discharge branch connected in parallel with the first charge-discharge branch;
   a second switch between the second node and an output terminal of the charge-discharge module, a control terminal of the second switch being connected to the first node for controlling the second switch on-off operations according to the first pulse signal; and
   a second capacitor connected between the output terminal of the charge-discharge module and the ground terminal.

5. The flyback converter of claim 4, wherein the charge-discharge module further comprises:
   a unity gain amplifier between the second node and the second switch;
   wherein a first input terminal of the unity gain amplifier is connected to the second node; and
   wherein an output terminal of the unity gain amplifier is connected to the second switch.

6. The flyback converter of claim 3, wherein the voltage amplification module comprises:
   a converter configured to amplify an input voltage of the voltage amplification module by a first preset multiple and to generate an output current to a third node; and
   a current mirror configured to receive an input current from the third node, and to output an amplified current a second preset multiple of the input current to a fourth node;
   wherein the divider resistor is connected to the fourth node.

7. The flyback converter of claim 6, wherein the voltage amplification module further comprises:
   an offset current controller connected between the third node and a ground terminal to provide a preset offset current.

8. The flyback converter of claim 6, wherein the voltage amplification module further comprises:
   a first clamping circuit connected to a first terminal of the divider resistor away from the fourth node to clamp down a voltage at the first terminal of the divider resistor to a first preset voltage; and
   a second clamping circuit connected to the fourth node to clamp down a voltage at a second terminal of the divider resistor to a second preset voltage;
   wherein the first preset voltage is higher than the second preset voltage.

9. The flyback converter of claim 1 further comprising:
   a secondary side controller configured to generate a first control signal according to an output at the output terminal of the flyback converter; and
   an isolator configured to connect between the main controller and the secondary side controller disposed on the secondary side, the main controller being disposed on the primary side connected to the gate of the main switch;

wherein the main controller comprises:
a receiving unit connected to the isolator to receive the first control signal generated by the secondary side controller, the receiving unit outputting the first control signal as a trigger-on signal;
a driving unit configured to receive the trigger-on signal and to generate the gate control signal to turn on the main switch; and
a control unit configured to receive the gate control signal and to generate a second control signal after a constant on-time;
wherein the driving unit receives the second control signal as a trigger-off signal to generate the gate control signal to turn off the main switch.

10. The flyback converter of claim 9, wherein the control unit further comprises
a first input terminal connected to a first voltage terminal; and
a second input terminal connected to the gate of the main switch;
wherein the control unit processes a first voltage at the first voltage terminal and a gate voltage of the main switch to generate the second control signal; and
wherein the first voltage at the first voltage terminal is proportional to an input voltage at the input terminal of the flyback converter.

11. The flyback converter of claim 10, wherein the main controller further comprises
a trigger configured with a set terminal connected to receive the first control signal from an output terminal of the receiving unit, the trigger comprising
a reset terminal connected to receive the second control signal from an output terminal of the control unit; and
an output terminal of the trigger coupled to the gate of the main switch through the driving unit;
wherein when the receiving unit outputs the first control signal to the set terminal of the trigger, the driving unit drives the main switch to turn on;
wherein when the control unit outputs the second control signal to the reset terminal of the trigger, the driving unit drives the main switch to turn off;
wherein when the main switch is turned on, the control unit generates the second control signal by processing the first voltage; and
wherein when the main switch is turned off, the control unit does not output the second control signal.

12. The flyback converter of claim 11, wherein the control unit further comprises:
a first amplification module comprising
an input terminal connected to the first voltage terminal; and
an output terminal of the first amplification module connected to a fifth node, the first amplification module amplifying a current or voltage by a third predetermined multiple;
a first transistor comprising
a gate connected to the gate of the main switch through an inverter;
a drain connected to the first input terminal of a first comparator at the fifth node; and
a source connected to a ground terminal;
a third capacitor comprising
a first terminal connected to the fifth node; and
a second terminal connected to the ground terminal; and
the first comparator comprising
a first input terminal connected to the fifth node,
a second input terminal connected to the reference voltage, wherein when a voltage value at the first input terminal of the first comparator is greater than the reference voltage, the first comparator outputs the second control signal;
wherein the flyback converter operates in discontinuous conduction mode (DCM);
wherein the first amplification module, the first transistor and the third capacitor constitute the input unit of the main controller; and
wherein the first comparator constitutes the comparison unit of the main controller.

13. The flyback converter of claim 1 further comprising a primary side controller connected to the gate of the main switch;
wherein the main controller is coupled to the primary side controller through an isolator;
wherein the main controller comprises:
a receiving module comprising an input terminal coupled to the secondary coil through a detection resistor to detect a current flowing through the secondary coil;
a second amplification module configured to amplify a current outputted by the receiving module by a fourth predetermined multiple;
a second transistor comprising a gate connected to the gate of the main switch through an inverter, a drain connected to a sixth node, and a source connected to a ground terminal;
a fourth capacitor comprising a first terminal connected to the sixth node, and a second terminal connected to the ground terminal; and
a second comparator comprising a first input terminal connected to the sixth node, and a second input terminal connected to the reference voltage, wherein when a voltage value at the first input terminal of the second comparator is greater than the reference voltage, the second comparator outputs the on time control signal;
wherein the on time control signal output by the main controller is transmitted to the controller of the primary side via the isolator to enable the primary side controller to turn on the main switch;
wherein the second amplification module, the second transistor and the fourth capacitor constitute the input unit of the main controller; and
wherein the second comparator constitutes the comparison unit of the main controller.

14. The flyback converter of claim 13, wherein the receiving module comprises a sample and hold circuit, wherein an input terminal of the sample and hold circuit is connected to the detection resistor; and wherein an output terminal of the sample and hold circuit is connected to an input terminal of the second amplification module.

* * * * *